US009001979B2

(12) United States Patent
Nix et al.

(10) Patent No.: US 9,001,979 B2
(45) Date of Patent: Apr. 7, 2015

(54) APPARATUS AND METHOD FOR ANONYMOUSLY PRESENTING TARGETED ADVERTISEMENTS AND DESIRABLE MEDIA CONTENT IN ASSOCIATION WITH A VIRTUAL CURRENCY

(76) Inventors: Joseph D. Nix, Fort Wayne, IN (US); Michael Wallace Verhulst, Springfield, IL (US); Donald Charles Ganiere, Ottawa, IL (US); Matthew Wayne Cox, Columbia, MD (US); Christopher Warren Smith, Birmingham, AL (US); Thomas Nathaniel Supple, Sycamore, IL (US)

( * ) Notice: Subject to any disclaimer, the term of this patent is extended or adjusted under 35 U.S.C. 154(b) by 476 days.

(21) Appl. No.: 13/384,492

(22) PCT Filed: Jul. 19, 2010

(86) PCT No.: PCT/US2010/042399
§ 371 (c)(1),
(2), (4) Date: Mar. 30, 2012

(87) PCT Pub. No.: WO2011/009113
PCT Pub. Date: Jan. 20, 2011

(65) Prior Publication Data
US 2012/0191518 A1 Jul. 26, 2012

Related U.S. Application Data

(60) Provisional application No. 61/271,207, filed on Jul. 17, 2009.

(51) Int. Cl.
*H04M 1/64* (2006.01)
*G06Q 30/02* (2012.01)
(52) U.S. Cl.
CPC ............ *G06Q 30/02* (2013.01); *G06Q 30/0215* (2013.01)

(58) Field of Classification Search
USPC .......... 379/67.1, 76, 88.13, 88.17, 88, 19, 22, 379/93.03, 93.06, 93.12, 93.13, 114.1, 379/114.12, 114.13, 120, 183, 207.15, 265; 705/14.16, 14.19, 14.23, 14.29–14.36
See application file for complete search history.

(56) References Cited

U.S. PATENT DOCUMENTS

| 7,249,099 B2 | 7/2007 | Ling |
| 2008/0281692 A1 | 11/2008 | Zhang et al. |
| 2008/0306826 A1 | 12/2008 | Kramer et al. |

FOREIGN PATENT DOCUMENTS

| JP | 2007156368 A | 6/2007 |
| KR | 20090003942 A | 1/2009 |

OTHER PUBLICATIONS

Miyamoto Daiki et al., Advertisement Distributing and Incentive Providing System Using Mail Transmitted and Received Between Mobile Terminals Having Communication Function, as Media, Abstract of Japanese Patent Application, Publication No. JP2007156368, published Jun. 21, 2007.

(Continued)

*Primary Examiner* — Md S Elahee
(74) *Attorney, Agent, or Firm* — Patzik, Frank & Samotny Ltd.

(57) ABSTRACT

An electronic advertising system anonymously directs the attention of a user to content provided by an advertiser, in exchange for subsequently permitting the same user to access otherwise restricted desirable content of another part. Such desirable content may include online entertainment media, digital video content, social media, news media, and other privileged services or data. The user accumulates points, or virtual currency, in exchange for viewing the advertisements of vendor affiliates of the present system. The user may then spend previously accumulated points, or virtual currency, in order to access desirable content of redeemer affiliates of the present system. The present system further facilitates financial transactions between the system operator, vendor affiliates, and redeemer affiliates, relative to the movement of virtual currency amongst the various parties.

16 Claims, 22 Drawing Sheets

(56) References Cited

OTHER PUBLICATIONS

IF Co. Ltd., Method and System for Reserving and Using Point Obtained by Exposing Advertisement in Online Game, Abstract of Korean Patent Application, Publication No. KR20090003942, published Jan. 12, 2009.

IF Co. Ltd., Method and System for Reserving and Using Point Obtained by Exposing Advertisement in Online Game, Electronic Translation of Korean Patent Application, Publication No. KR20090003942, published Jan. 12, 2009.

Korean Intellectual Property Office, International Search Report issued in priority PCT Application No. PCT/US2010/042399, dated Jan. 27, 2011.

U.S. Patent and Trademark Office, International Preliminary Report on Patentability issued in priority PCT Application No. PCT/US2010/042399, dated Sep. 30, 2011.

Korean Intellectual Property Office (KIPO), International Search Report and Written Opinion of the International Searching Authority, issued in connection with corresponding PCT application No. PCT/US2010/042399 on Jan. 27, 2011.

U.S. Commissioner for Patents, International Preliminary Report on Patentability issued in connection with corresponding PCT application No. PCT/US2010/042399 on Sep. 20, 2011.

|  | Data A.1 | Data A.2 | ... | Data A.n |
|---|---|---|---|---|
| Data B.1 | A.1;B.1 | A.2;B.1 | ... | A.n;B.1 |
| Data B.2 | A.1;B.2 | A.2;B.2 | ... | A.n;B.2 |
| ... | ... | ... | ... | ... |
| Data B.n | A.1;B.n | A.2;B.n | ... | A.n;B.n |

| | |
|---|---|
| 1619 | ? id INT |
| 1620 | ◇ vendors_name VARCHAR(45) |
| 1621 | ◇ login_user_name VARCHAR(45) |
| 1622 | ◇ login_pasword_hash VARCHAR(45) |
| 1623 | ◇ vendors_id_number INT |
| 1624 | ◇ vendors_payment_history LONGTEXT |
| 1625 | ◇ total_points_vended INT |
| 1626 | ◇ total_points_redeemed INT |
| 1627 | ◇ points_vended_history LONGTEXT |
| 1628 | ◇ points_redeemed_history LONGTEXT |
| 1629 | ◇ id__number_tokenization VARCHAR(45) |
| 1630 | ◇ number_of_administrators INT |
| 1631 | ◇ administrators_user_and_hash LONGTEXT |
| 1632 | ◇ points_vendor_rates LONGTEXT |
| 1633 | ◇ points_redeemer_rates LONGTEXT |
| 1634 | ◇ phone_number VARCHAR(45) |

1635 — id INT
1636 — redeemers_name VARCHAR(45)
1637 — login_user_name VARCHAR(45)
1638 — login_password_hash VARCHAR(45)
1639 — redeemer_id_number INT
1640 — redeemer_payment_history LONGTEXT
1641 — total_points_vended INT
1642 — total_points_redeemed INT
1643 — points_vended_history LONGTEXT
1644 — points_redeemed_history LONGTEXT
1645 — id_number_tokenization VARCHAR(45)
1646 — number_of_administrators INT
1647 — administrators_user_and_hash LONGTEXT
1648 — points_vendor_rates LONGTEXT
1649 — points_redeemer_rates LONGTEXT
1650 — phone_number VARCHAR(45)

FIG. 16C

APPARATUS AND METHOD FOR ANONYMOUSLY PRESENTING TARGETED ADVERTISEMENTS AND DESIRABLE MEDIA CONTENT IN ASSOCIATION WITH A VIRTUAL CURRENCY

CROSS REFERENCE TO RELATED APPLICATIONS

This application claims the benefit of U.S. provisional patent application No. 61/271,207, filed Jul. 17, 2009, the entirety of which is hereby incorporated by reference.

BACKGROUND OF THE INVENTION

1. Field of the Invention

The present invention relates, in general, to the presentation of electronic advertisements, such as via the Internet and, more particularly to the presentation of targeted advertisements in a manner that does not track an individual's Internet page navigation and history.

2. General Background of the Invention

One issue facing the electronic advertising industry is the trade-off between maximizing the amount of entertaining or desirable content that an individual exploring the Internet wants to see against the amount of advertising that is overlaid on top of or near such entertaining or desirable content.

Escalating the issue, many online advertisers have implemented rather obtuse advertising systems that are often perceived as annoying to the end user, including pop-up ads and in text callout balloons. Unfortunately, such systems necessarily force the participant's attention to be split between the advertisement and the non-advertising content. This split is often less than desirable to all parties involved.

Many current consumers of digital media want to experience, watch, and/or consume the content of their choice at the time of their choosing. Therefore, many of these consumers do not particularly appreciate advertising methods that more or less randomly interrupt the experience of the participant. Thus, a need exists for a technology that simultaneously satisfies the interests of advertisers in terms of their desires to broaden their exposure base and keep consumers informed of new products and services without overwhelming the end user, and media viewer with unwanted, potentially annoying, unwelcome, and unexpected advertising presentations.

A further drawback of many contemporary electronic advertising systems is that it is not uncommon for an individual or entity to be offended by advertising content that is presented side-by-side with primary non-advertising content. Thus, there is a need for advertising systems that give unprecedented levels of user control to the end media viewer or individual exploring the Internet.

Another drawback of many contemporary systems is that a significant number of contemporary digital advertising systems leverage some type of algorithmic data mining, whereby the advertiser generates, buys, or records personal information such as web browser history, shopping trends, profile and social network picture viewing statistics, age, gender, marital status, family status, sexual orientation, religious persuasion, computer software and hardware configurations, indications of salary or generic financial success, and numerous other examples of personal data. Many individuals express an extremely strong desire for such tracking technologies to become rare, optional, or even non-existent.

Accordingly, a digital advertising technology that is completely anonymous while at the same time offers advertisers some form of tangible assurance that their advertising messages are targeted would be beneficial.

The present invention provides a method to offer some tangible assurance to advertisers that their content is being viewed by individuals who are interested and more likely to buy the merchandise being embodied in the advertisement than a random individual would be.

SUMMARY OF INVENTION

The present invention provides, in general, an apparatus, system, and method for facilitating and conducting electronic marketing and customer retention using a virtual currency in the form of electronic "points" as a medium of exchanging and/or rewarding the attention of a given Internet consumer. Individual web surfers who use the present invention are referred to herein as "users." As an individual user accesses and explores Internet-based websites, services, and/or other sources of media of certain companies affiliated with the present electronic marketing and customer retention system, such individual user is rewarded by being given a plurality of electronic points.

Later, as an individual user accesses and explores the websites or other media sources of certain other companies affiliated with the present electronic marketing and customer retention system, such an individual may redeem predetermined quantities of these previously earned electronic points in exchange for access to certain otherwise restricted media. The ability of an individual Internet web surfer to use this marketing and customer retention system is not predicated upon the user's expenditure of cash or other forms of tangible consideration, nor is it predicated upon the user allowing the company to sell or otherwise profit from any personal information of the user that could have been gathered electronically.

Moreover, the present invention does not require the utilization of conventional electronic advertising mechanisms, such as pop-up ads, banner ads, e-mail marketing, e-mail spam, Rich Media Ads, interstitial ads, online classified ads, and search engine results. Of course, the owner/operator of a website who is affiliated with the present electronic marketing and customer retention system may opt to continue to additionally use such conventional electronic advertising mechanisms.

Additionally, a user who has accumulated what is deemed by certain predetermined settings or parameters of the system predetermined to be a sufficient number of electronic points will be able to "spend" those points in a manner permitting the user to legitimately circumvent many models of current online advertising that are considered by many to be annoying or intrusive. For example, many web surfers currently must watch pre-video commercials before they view certain desired video media content made available to them through many websites that stream videos, such as, for example, video news segments. Such accumulated electronic points can also be redeemed for a large variety of intangible virtual goods: social networking apps, smartphone apps, music downloads, video game expansions, add-ons, character upgrades, secret in-game weapons, and any manner of current and future virtual goods. The electronic points can be redeemed for any content that is prohibited to those who do not exchange a predetermined quantity of electronic points for access to such content. These electronic points may vary in, for example, value, name, market, lifetime, geographic distribution, class, convertibility, and in other ways without deviating from the scope of the present invention.

In addition to the custom, application specific software, data, system and methods of the present invention, the present invention utilizes conventional, off-the-shelf software components, computers, servers, networks, information management services, databases, session management, and other technologies and electronics associated with modern computing and communication. Moreover, it will be apparent to one skilled in the art that currently unspecified and future developed methods of human and computer interaction will provide a suitable opportunity for the distribution, accumulation, and marketing of the electronic points of the present invention, and that usage of such human/computer interaction, does not depart from the scope of the present invention.

An embodiment of the present invention comprises a method for attracting consumers to electronic-based advertising media via a communications network having endpoints comprising at least one vendor computer system associated with at least one advertising provider, at least one redeemer computer system associated with at least one provider of goods or services, at least one host computer system, and at least one user computer system. The method comprises the steps of identifying a consumer on the host computer as a registered user; detecting that the registered user has accessed electronic-based advertising media of the at least one advertising provider, the electronic-based advertising media being communicated from the at least one vendor computer system to the at least one user computer system via the communications network; awarding the registered user a first predetermined quantity of electronic currency in exchange for the registered user accessing the electronic-based advertising media; storing on the at least one host computer system a stored value indicative of an aggregate amount of electronic currency possessed by the registered user; incrementing the stored value by a first amount indicative of the first predetermined quantity of electronic currency; detecting that the registered user has requested particular goods or services of the provider of goods or services via communication between the at least one user computer system and the at least one redeemer computer system via the communications network, the particular goods or services having an associated second predetermined quantity of electronic currency; and determining whether the second predetermined quantity of electronic currency has a value equal to or greater than the stored value indicative of an aggregate amount of electronic currency possessed by the registered user.

An embodiment of the present invention may further comprise the steps of indicating to the at least one redeemer computer system that the registered user has a sufficient quantity of electronic currency to be permitted to receive or access the goods or services; and decrementing on the at least one host computer the stored value by a second amount indicative of a second predetermined quantity of electronic currency, the second amount being a predetermined value associated with the particular goods or services requested by the registered user.

The present invention preferably supports maintaining the anonymity of system users. In particular, no indication is provided to the at least one advertising provider regarding how the registered user spends the first predetermined quantity of electronic currency awarded in exchange for the registered user accessing the electronic-based advertising media. Moreover, no personal identifying information relative to the registered user is provided to the at least one advertising provider. Furthermore, no indication is provided to the at least one provider of goods or services regarding how the registered user acquired the second predetermined quantity of electronic information expended by the user in exchange for the goods or services of the at least one provider of goods or services. Likewise, no personal identifying information relative to the registered user is provided to the at least one provider of goods or services, and no communication takes place between the at least one vendor computer and the at least one redeemer computer.

The aforementioned goods or services may comprise services comprising a delivery of electronic media. The electronic media is sent from the at least one redeemer computer to the at least one user computer system via the communications network. Moreover, the step of detecting that the registered user has accessed electronic-based advertising media may, in an embodiment of the invention, comprise detecting that the registered user has accessed particular website content associated with the at least one vendor computer system.

An embodiment of the present invention comprises an apparatus for attracting consumers to electronic electronic-based advertising media. The apparatus comprises a communications network; at least one vendor computer system associated with at least one advertising provider, the at least one vendor computer system being operably coupled to the communications network; at least one redeemer computer system associated with at least one provider of goods or services, the at least one redeemer computer system being operably coupled to the communications network; at least one host computer system operably coupled to the communications network; at least one user computer system associated with a consumer, the at least one user computer system being operably coupled to the communications network; means for identifying a consumer on the host computer as a registered user; means for detecting that the registered user has accessed electronic-based advertising media of the at least one advertising provider, the electronic-based advertising media being communicated from the at least one vendor computer system to the at least one user computer system via the communications network; means for awarding the registered user a first predetermined quantity of electronic currency in exchange for the registered user accessing the electronic-based advertising media; means for storing on the at least one host computer system a stored value indicative of an aggregate amount of electronic currency possessed by the registered user; means for incrementing the stored value by a first amount indicative of the first predetermined quantity of electronic currency; means for detecting that the registered user has requested particular goods or services of the provider of goods or services via communication between the at least one user computer system and the at least one redeemer computer system via the communications network, the particular goods or services having an associated second predetermined quantity of electronic currency; and means for determining whether the second predetermined quantity of electronic currency has a value equal to or greater than the stored value indicative of an aggregate amount of electronic currency possessed by the registered user.

An embodiment of the present invention may further comprise means for indicating to the at least one redeemer computer system that the registered user has a sufficient quantity of electronic currency to be permitted to receive or access the goods or services; and means for decrementing on the at least one host computer the stored value by a second amount indicative of a second predetermined quantity of electronic currency, the second amount being a predetermined value associated with the particular goods or services requested by the registered user.

BRIEF DESCRIPTION OF THE DRAWINGS

FIG. 7 is a simplified block diagram of a database of the type employed by the present invention;

FIGS. 16A-16D are diagrams of relational database tables which may be employed by the present invention;

DETAILED DESCRIPTION OF THE INVENTION

Figure 1:
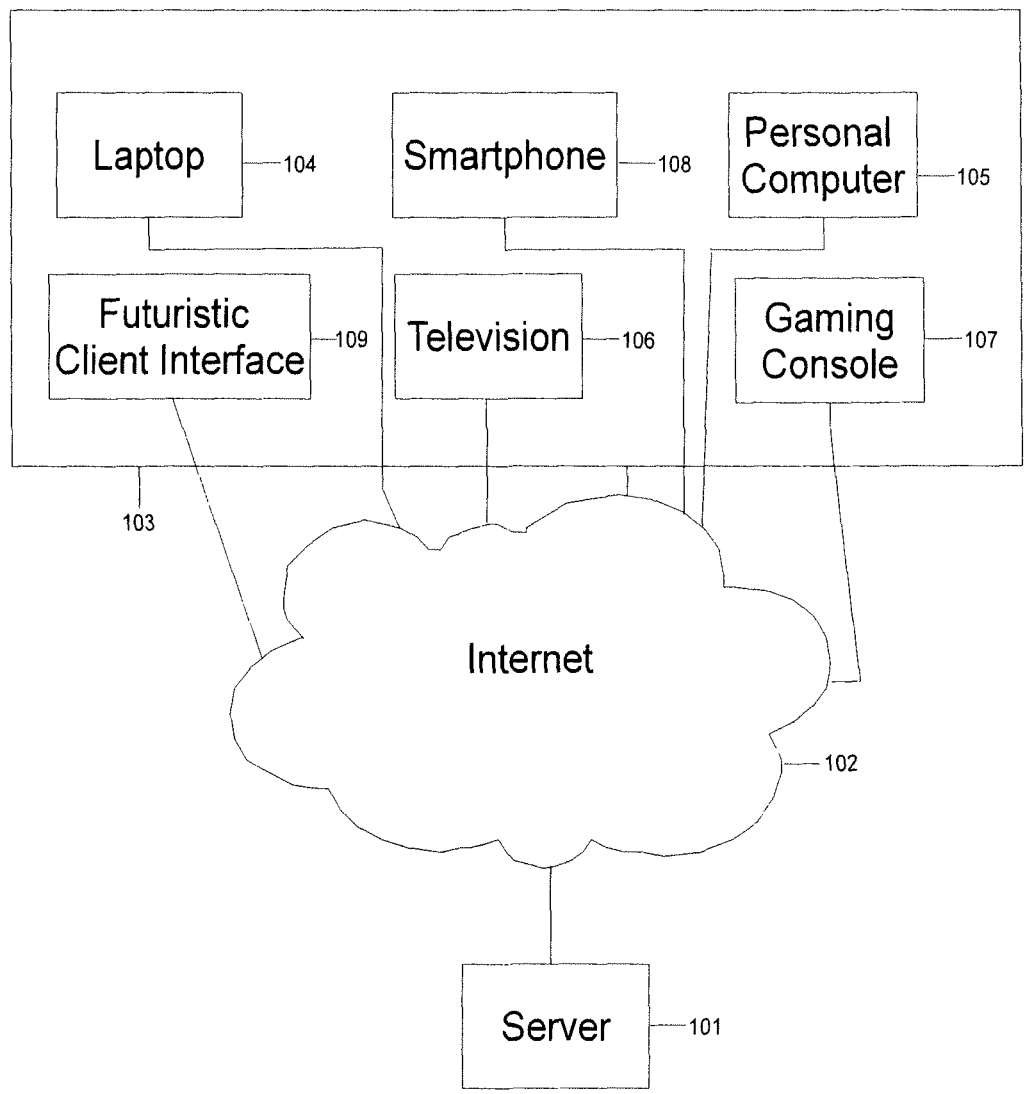
FIG. 1 is simplified diagram of the equipment and networked environment which may be associated with the present invention.

While the present invention is susceptible of embodiment in many different forms, there is shown in the drawings and will herein be described in detail, several specific embodiments, with the understanding that the present disclosure is intended as an exemplification of the principles of the present invention and is not intended to limit the invention to the embodiments illustrated.

Referring to FIG. 1, the electronically interconnected computer environment and apparatus of the present invention is shown. Much of the digital processes and systems management functions of the present invention are controlled and run on one or more servers 101. Any number of servers 101 may be connected to an external network 102, such as the Internet. A wide variety of types of user interface devices enabled to access network 102 may interact with the present invention via communication with servers 101. Devices 103 may comprise many different communication devices including laptop computers 104, desktop computer 105, network-enabled televisions 106, gaming consoles 107, smartphones 108, tablets and any other kind of current or future communication device 109. Servers 101 run a plurality of software programs for the purposes of performing management functions of the present invention including managing the number of points accumulated by a user, given out by vendors, and received by redeemers; authenticating users; registering new users; managing payment and financial transactions; performing Internet searches; accessing databases; and routing traffic over the network. Network enabled devices 103 are connected to servers 101 through external network 102 and are used by users who are utilizing the present invention to visit affiliate websites or otherwise access affiliate media in order to accumulate and redeem points, manage their user accounts, send search queries to search engines in order to find more websites also using the present invention. Devices 103 make use of programming languages to run, execute, interpret, or otherwise make use of the code necessary to utilize and cooperate with the present invention.

Of course, the various functions performed by server computer 101 may alternatively be performed by several server computers interacting through one or more networks. Moreover, the functions performed by network enabled device 103 may alternatively be performed by several computers acting jointly, such as by interacting through one or more networks. These distributions of tasks may be done, for example, for performance reasons.

Figure 2:
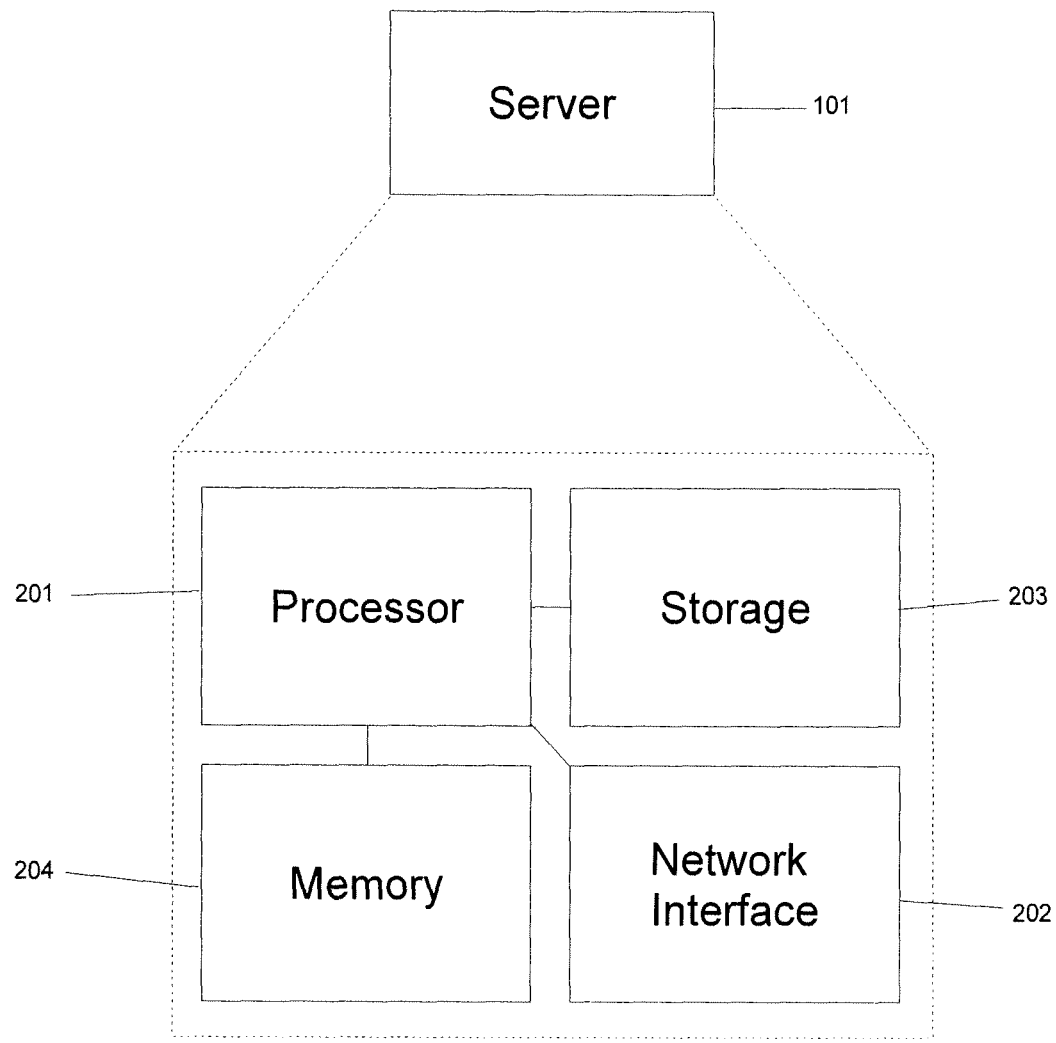
FIG. 2 is a simplified diagram of the server of FIG. 1.

Referring to FIG. 2, server 101 is shown as comprising several hardware components, including processor 201, network interface 202, storage 203, and memory 204. These components cooperate, in conjunction with associated firmware and software, to perform the tasks required of server 101.

Figure 3:
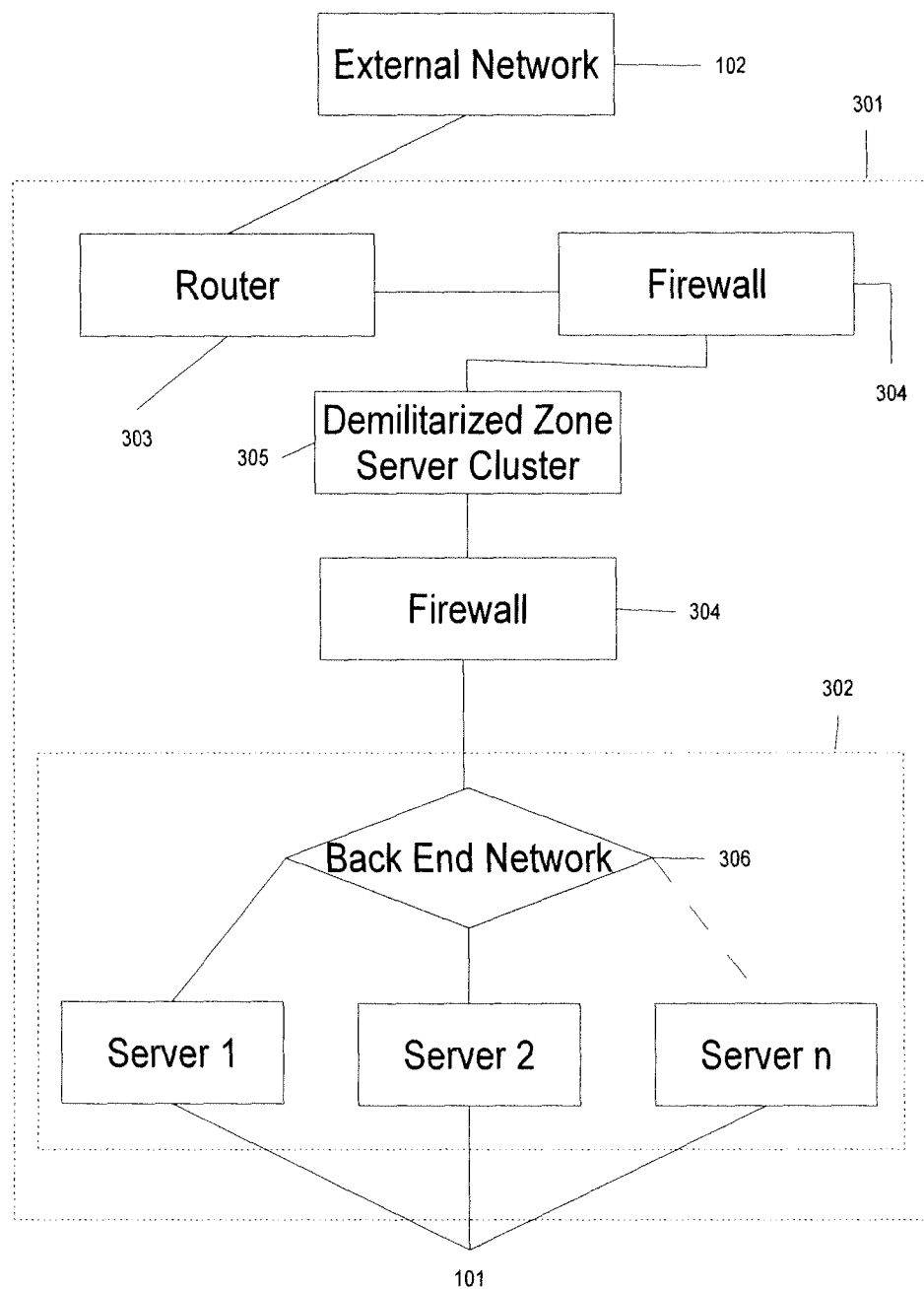
FIG. 3 is a simplified diagram of a data center which may be associated with the present invention.

Referring to FIG. 3, in a preferred embodiment of the invention, certain computer logic desirable or necessary to run and manage the present invention is disposed inside centralized data center 301 incorporating a plurality of servers 101 as a part of centralized server cluster 302. Data center 301 is connected to external network 102 through edge router 303. Edge router 303 is preferably a networking appliance designed to control and organize traffic in a network. In turn, edge router 303 is connected to firewall 304, which is designed to filter and protect against unauthorized and unwanted communications between computer networks or hosts. On the protected side of firewall 304 lies a cluster of servers, demilitarized zone 305, providing web services via the Internet that typically are not considered to be critical from a security standpoint. Demilitarized zone 305 provides, amongst other services, static content web services that handle commonly requested web address accesses, Domain Name System services that assist routers in intercommunication between other servers, and other miscellaneous front end services. Front end services, like static content web services and domain name services, are services that do not require the highest security protocols. They are thus less protected, and in turn they are accessed and used more quickly. Adjacent to this moderate security area is second firewall 304 tasked with directly protecting a back end portion of data center 301. Back end services are high security applications which necessarily have access to sensitive user and clientele data. Such information includes such data as usernames, passwords, email addresses, number of accumulated points, dates of registration, ages, business names, credit card information, payments given out, payments received, other financial account information, points given out, points redeemed, cryptographic services, and authentication services. Amongst other functions, back end servers 101 access databases, programming languages, executable and interpretable programs, in order to handle the processes they are in control over.

Referring back to FIG. 1, servers 101 of server cluster 302 communicate amongst themselves and with miscellaneous network connected devices 103 distributed throughout the external network 102 with text-based messages. These text-based messages adhere to predetermined messaging protocols and contain information that is of relevance to the sender and receiver of the message. This information includes authentication data, status messages, point count data and other information needed for servers 101 or network connected devices 103 to process any given request.

Figure 4:
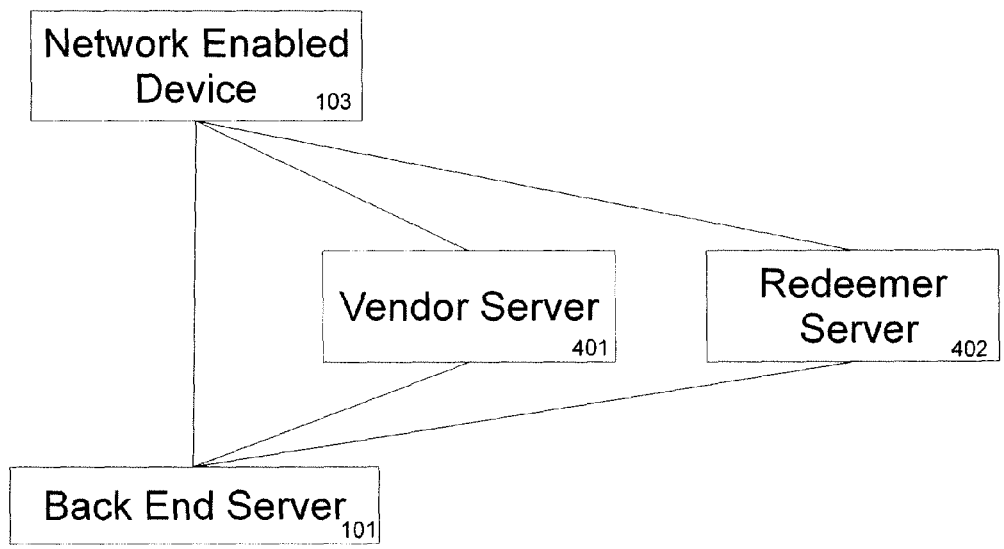
FIG. 4 is a simplified diagram showing networked data connectivity between a user of the present invention and certain equipment of the networked environment.

Referring to FIG. 4, there are, in general, four different types of geographically dispersed computer and server systems connected to external network 102 employed by the present invention. First, there is network enabled device 103. Network enabled device 103 allows a user to access web content and services exposed by back end server 101. Second, there is back end server 101 which services text-based messages and other messages sent by and between the major computer components of the present invention. Third, there are third party affiliate vendor servers 401. These third party servers control the points distributed by any particular affiliate vendor. Fourth, there are third party affiliate redeemer servers 402. These third party servers control the points redeemed by any particular affiliate redeemer. Vendor server 401 can access both network enabled device 103 and back end server 101, but cannot access the redeemer server 402. Likewise, redeemer server 402 can access both network enabled device 103 and back end server 101, but cannot access the vendor server 401.

Figure 5:
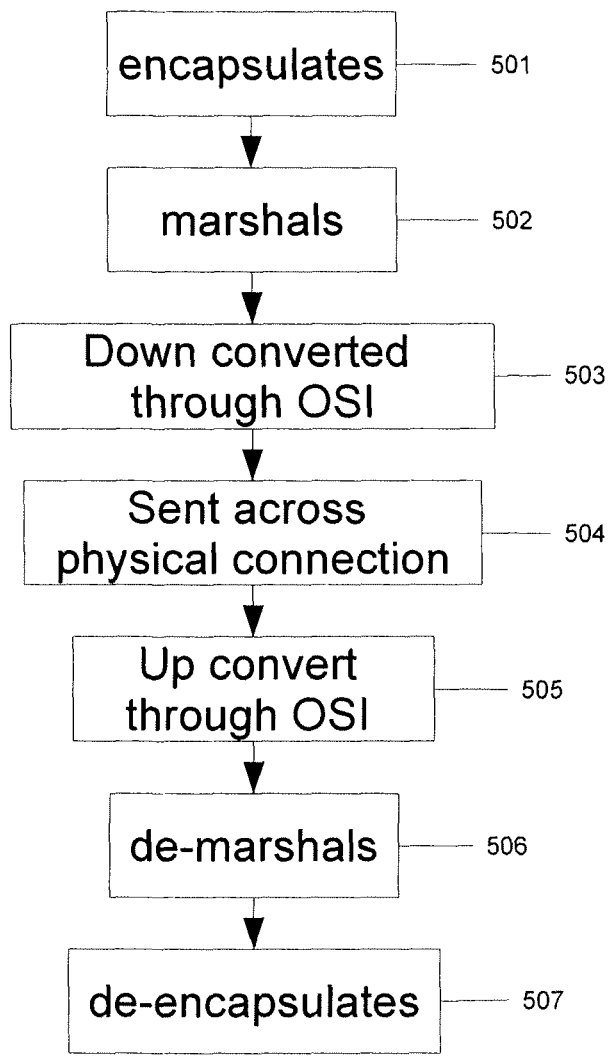
FIG. 5 is a data flow diagram showing, in particular, the modification of information packets and other data for communication between devices.

Referring to FIG. 5, when server 101 sends a text-based message, server 101 first encapsulates 501 the message. Next the encapsulated data is marshaled 502 into a form recognizable as a valid function call to a target computer of the clientele. This target computer, maintained by the clientele, is located in or interfaced to external network 102. The marshaled data may comprise, for example, a form of remote procedure call. This marshaled data is down converted through the Open Systems Interconnection ("OSI") model layers 503. The OSI is an internationally standardized interface between hardware and software that allows streamlined intercommunication between various electronics and computer architectures. The down conversion through the OSI layers 503 is primarily handled by network hardware inside computers via network interface 202. Next, the data is sent across the physical connection 504. On the other side of physical connection 504, a targeted recipient computer at an endpoint of external network 102 begins to up convert the message up through OSI layers 505. After OSI conversion the messages are sent to a software application in the target computer capable of processing remote procedure calls where the message is de-marshaled 506. The de-marshaled data is now de-encapsulated 507 before being used by the target computer.

Figure 6:
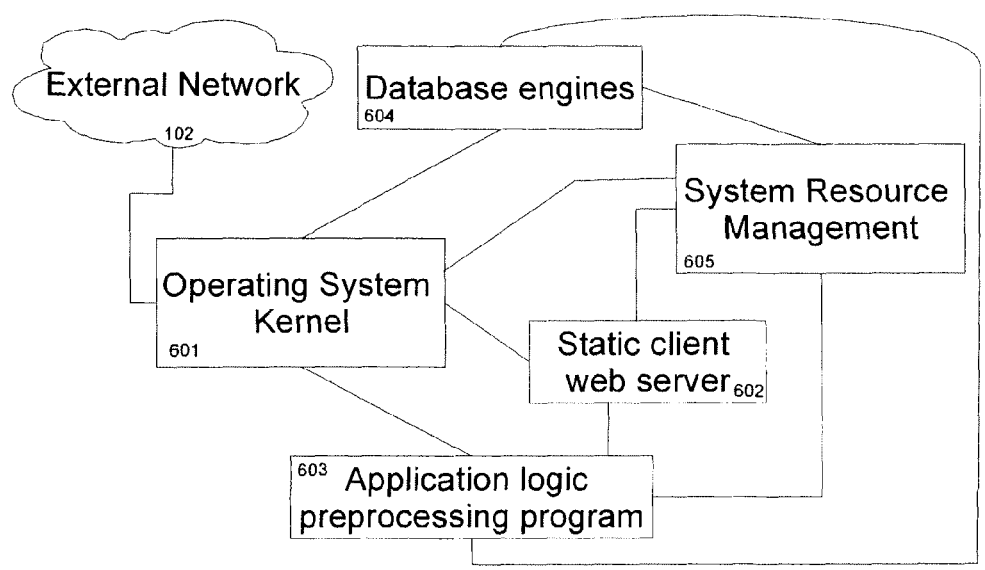
FIG. 6 is a simplified diagram of major server software components employed, managed and run by certain aspects of the present invention.

Referring to FIG. 6, much of the software used to implement this present invention is subdivided into a task oriented organization. For example, in a preferred embodiment, the present invention makes use of operating system kernel 601 running on server 101, which is tasked with managing miscellaneous server hardware as described in FIG. 2 and application programs. These application programs may implement several different languages, operating environments, precompiled or interpretable code. These subdivided applications include static content web servers 602, active content creation, preprocessing, common gateway interface 603, database engines 604 server resource management, health checking, and status report software 605.

Referring now FIG. 7, data that is recorded and tracked by the present invention in a preferred embodiment is stored in one or more databases 701. Each database 701 comprises an application that runs in a server 101, which may be a dedicated database server or a shared application/database server that uses computer code designed to manage a physical database, which, in turn, may be stored in one of more physical files. This database is stored on the file system of a server 101. This file system is in turn located in physical storage 203 or memory 204. A data structure that is designed for optimized storage and retrieval is used as the technical foundation for database 701. Within this data structure is an abstraction commonly referred to as columns and rows. Each column or row contains a list of specific types of variables. In a preferred embodiment, a column or row has an associated name or title indicating the kind of data stored in the rest of the column or row. For example, a column or row with the title of username may contain a list that contains usernames. This connection does not need to be explicit, and titles of columns or rows may not give easily interpretable titles or data. Also, a database can store, organize, and retrieve an arbitrary amount of data in nearly any form.

This database 701 is accessed by software applications designed to manage it sometimes referred to as database engines 604. The functionality of this database engine is in turn invoked by any manner of application logic processing program 603.

Before being able to use the present invention, potential user must first create an account with the operator of the present invention. After the creation of the account, the user then needs to log in to use the present invention. Once logged in the user may then access any number of different affiliate websites.

Figure 12:
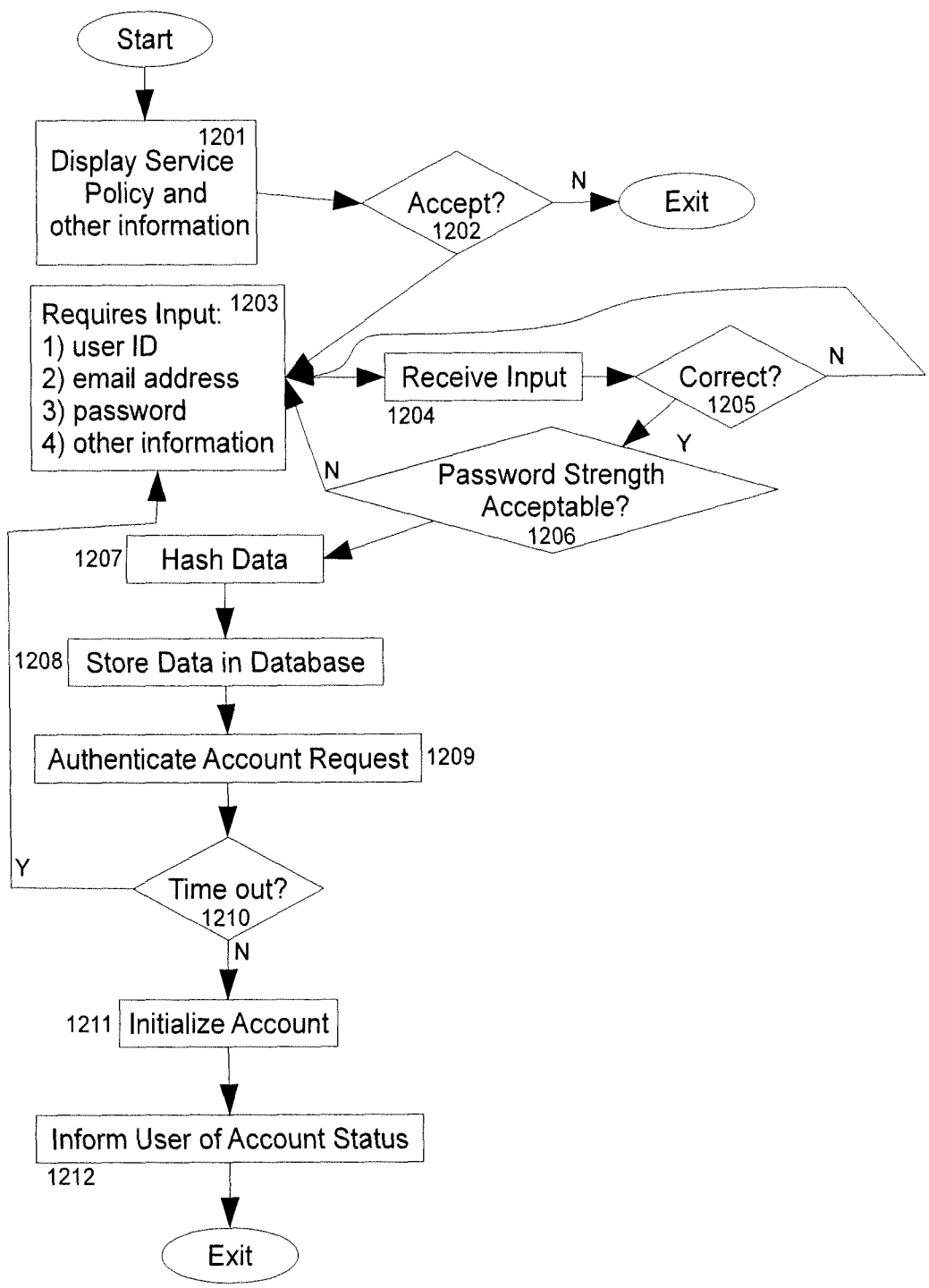
FIG. 12 is a flowchart showing the creation of a user account.

Referring to FIG. 12, the general process of user account creation, which includes communication back and forth between a user's network enabled device and a back end server, is shown. At the start of the process of creating a new user account, software operating on a back end server will cause a service policy and other related information 1201 that the overall system operator of the present invention wishes to show new users to be displayed upon the user's network enabled device. The software will ensure that the new user accepts and agrees to the terms and conditions outlined 1202. If the user accepts these terms, the user is then asked to input certain required information 1203 and possibly some optional information, otherwise, if the user does not accept the terms, then the user is not permitted to proceed. This required data may include a user identification name, an email address of the user, a password of the user, or other desired information. After the input is received 1204 it is checked for consistency 1205 and acceptable password strength 1206. If both of these checks are acceptable then the operator's server hashes the data 1207, otherwise, the user is asked again to supply the same required data. Once the data is hashed, the operator's server attempts to store the hashed data in a database 1208. If there is no conflicting data currently in the database, then the server authenticates the account request 1209. If it took the user too much time to input the required information in an acceptable form, the users account request will timeout 1210 and ask the user to resupply the required information. If the user has successfully had his or her account authenticated and not timed out, then the account is initialized 1211 in the server. The server then informs the user of the account status 1212 and exits the process of creating the account.

A technical description of the data transmissions of a preferred embodiment of the present invention will now be provided. A user activates a network enabled device 103 that is connected to the external network 102. The user uses this device 103 to send a text-based message through steps 501-507 of FIG. 5 to a server 101 using the present invention that is connected to the external network 102. This third party controlled server prepares a second text-based message, and sends it via steps 501-507 to servers 101 that are managing the present invention. In order for the message to reach servers 101, which are located in a centralized server cluster 302 of FIG. 3, the message must traverse external network 102, arrive at centralized data center 301, pass through edge router 303, first firewall 304, demilitarized zone 305, second firewall 304, and arrive at a server 101 tasked with handling back end services through a back end network 306 that is not connected to anything on the front end of the last firewall 304.

This back end server 101 receives the message through steps 501-507, processes it through static content web servers 602, which call an application logic processing program 603 of FIG. 6, which deciphers the message 401 and decides how to handle any remote procedure calls identified within it. If a remote procedure call requesting database 701 access is identified then the application logic processing program 603 calls the services of a database engine 604 which in turn access the internal data structure of the database 701. The database engine 604 returns data extracted from the database 701 to the application logic processing program 603, which uses this data to prepare response to the text-based message. During the preparation of the response to the text-based message, server 101 and the software applications it is running 601-605 of FIG. 6 may update or otherwise change the data in the internal data structure, or the internal data structure, in database 701.

There are many different potential responses to the text-based message that can be prepared by the application logic processing program 603. These responses may indicate the number of points attributed to the user's account, the last web page accessed by the user, the next web page the user wants to visit, the authenticated or log in status of the potential or actual user, the geographical location of user, and other data relevant to the present invention. One skilled in the art will understand that the present invention can be used in such a way as to require other types of data to be transmitted from servers 101.

Once application logic processing program 603 completes preparing a response to the text-based message, the response is sent back to the third party controlled server using the present invention which sent a message to back end servers 101. Next, the third party controlled server using the present invention utilizes application logic processing program 603 to decipher and interpret the results it received. The proper interpretation of the response sent from back end servers 101 is predicated on the predetermined rules governing the relationship between the business entity that manages back end servers 101 and the business entity that manages the third party servers. If the response appropriately follows these business rules, then the third party servers act in a specified way. As a first example of this response, if the pre-existing business rules establish that all properly authenticated and logged in users receive dispensations of points each time the user views certain content hosted on the third party servers, then a user gains some amount of points when viewing the specified content while logged in. The amount of points dispensed into the user's account is determined by the pre-existing business rules. As a second example, if the response indicates that a given user is currently logged in, properly authenticated, and has a sufficient number of accumulated points in their account, as judged when compared to the pre-existing business rules, then the third party server using the present invention grants the logged in user access to otherwise restricted content. Continuing with this example, since the business rules generally necessitate that the release of otherwise restricted content corresponds to the deduction of points from the users total accumulated points, such a deduction will take place. The amount of points deducted will also be determined by the pre-existing business rules. Of course, the identities of the third parties, the specific business rules, required user data, total point additions or subtractions, necessary computer and human interaction, interactive features, as well as other properties of these examples can vary from this example.

Irrespective of the particular business rules, once the third party servers using the present invention compare the business rules against the response received from back end servers 101, the third party servers send a text-based message through 501-507, to network enabled device 103 operably connected to external network 102. Next, network enabled devices 103 may display a human readable message to the web surfer.

A high level description of the general functionality of a preferred embodiment of the present invention will now be provided. A web surfer or other Internet user employs network enabled device 103 to access content provided by a third party through external network 102. The accessing of this content does not necessarily require a purchase of any goods or services, and may comprise, for example, only the viewing of a single webpage. In general, the business rules or criteria that are predetermined for a given third party may dispense points as a result of nearly any interaction with the web surfer or user otherwise accessing media content of the third party. The web surfer may see a connection established between device 103 and the third party servers assuming for descriptive purposes that the web surfer is knowingly attempting to establish a network connection and explore the websites and online content of a third party that is dispensing points. A user will expect to see visual notification of said points being added to the user's account. After the third party website has successfully established a connection with the device 103 a certain number of points, in accordance with pre-established criteria or business rules, will be deposited into the account of the user. This is all predicated on the logging in and authentication of the user, a connection between the third party servers and the back end server 101, and the following of the appropriate business rules.

Figure 15:
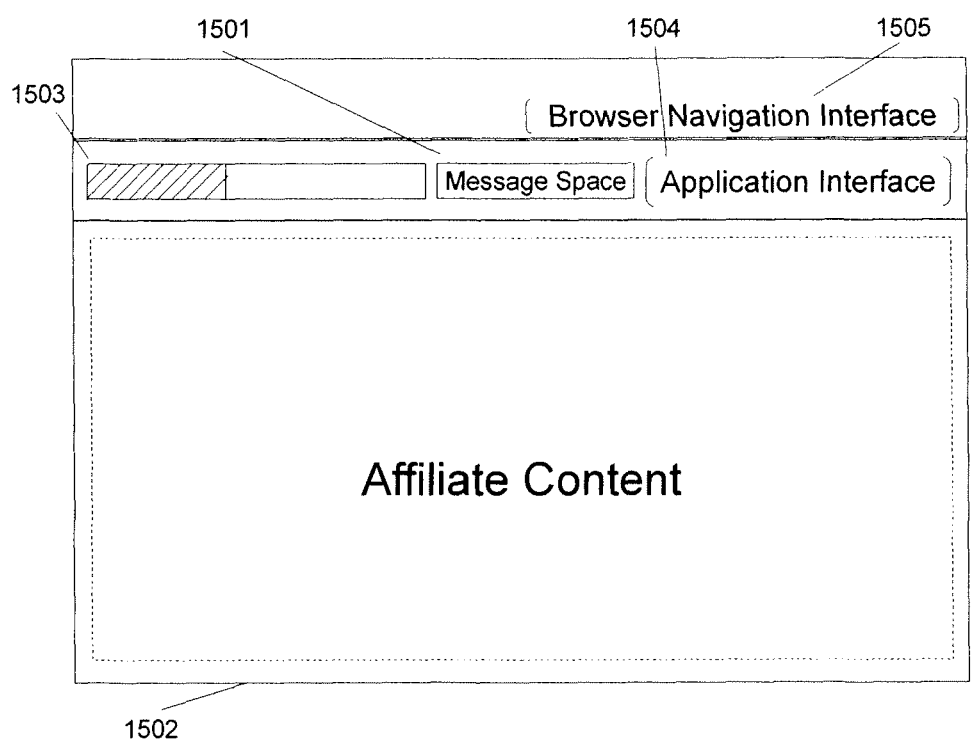
FIG. 15 is a simplified of an in-browser graphical user interface ("GUI") employed by the present invention.

Referring to FIG. 15, in a preferred embodiment, when logged into the present invention's system via the operator's server, the user sees or otherwise experiences on the user's network enabled device a slightly different version of the Internet websites than the user would otherwise normally encounter. The present invention uses a number of different technologies to accomplish this. In an embodiment of the present invention, among other changes to the user's browsing experience implemented by the present invention is the addition of toolbar 1501 in the use's web browser, at the top of the webpage window just below the top portion of the browser 1502. In toolbar 1501, progress bar 1503 or other indicator gradually fills, or increases in value, as the user accumulates points, and empties, or decreases in value, as the user spends or users previously acquired points. Accordingly, progress bar 1503 serves as an instantaneous indicator of how many points the user has accumulated and is currently available for use. Progress bar 1503 may be enhanced or replaced by a simple counter that numerically indicates the number of points the user has acquired. Also in toolbar 1501, application interface 1504 has been added to the screen and includes convenient hyperlinks that may be of interest to the user. Another item inside toolbar 1501 is a communication region reserved for messages 1505 issued to the user. There is also a software-based mechanism added to 1502 that allows the content within the browser 1502 to be programmatically hidden behind an obscuring veil, making the other rendered content unusable. All other aspects of the browser 1502 remain unchanged.

Figure 8:
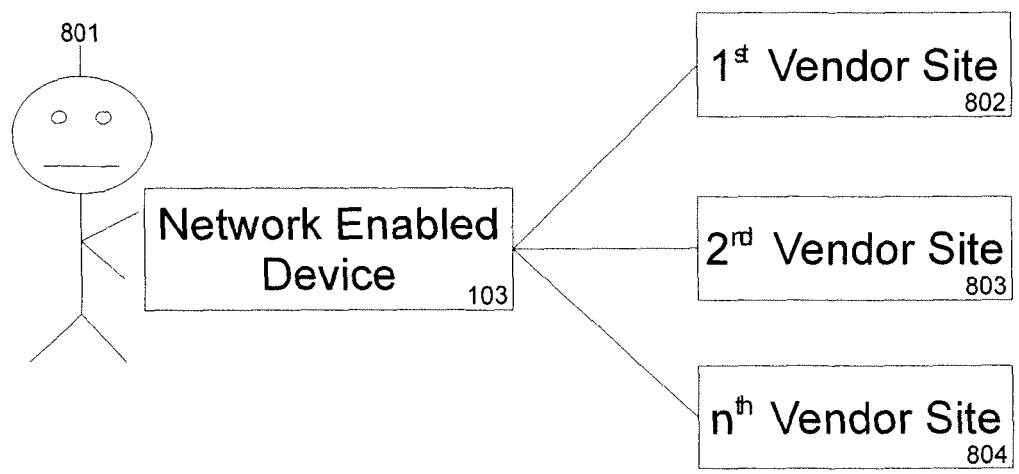
FIG. 8 is a diagram of a user accessing multiple affiliate vendor sites.

Referring to FIG. 8, user 801 accesses first affiliate vendor website 802. The third party business entity who manages this website 802 is called a "vendor" because they typically offer or promote goods or services for sale through their website, and because they are able to dispense points to users via the present invention. Because user 801 accesses content provided by first vendor website 802, first vendor website 802 dispenses an appropriate and predetermined amount of points to user 801. As a result, the number of points in the user's account is increased by the number of points given out by the vendor. User 801 may then navigate to a new website that may be, for example, a separate second vendor website 803, controlled by another, possibly distinct, third party business entity. Because user 801 accesses content provided by second vendor website 803, second website 803 dispenses points to the user 801. User 801 may then navigate to another new website that may be a separate, nth vendor website 804, controlled by another, possibly distinct, nth party. Because user 801 accesses content provided by nth vendor website 804, nth website 804 dispenses points to the user 801. This process whereby user 801 navigates through numerous, possibly separate vending websites and receives dispensations of points for this navigation and/or interaction with the websites could continue for an unlimited amount of navigation and or interactivity, as well as for an unlimited number of vendors, subject only to their affiliation with an operator of the present invention.

The points accumulated through such traversal of a large number of affiliate vending websites may all be identical. It is possible to implement the present invention in a manner such that no point may be distinguishable from any other point. It is also possible to implement the present invention such that all third party vendors are not aware of the number of points distributed by any other vendors. Moreover, variable amounts of information may be transferred between any of the parties using the present invention. Furthermore, the points permitted to be distributed by a particular third party vendor may be made to be identifiable, and thus distinguishable, from the points distributed by other third party vendors.

Figure 13:
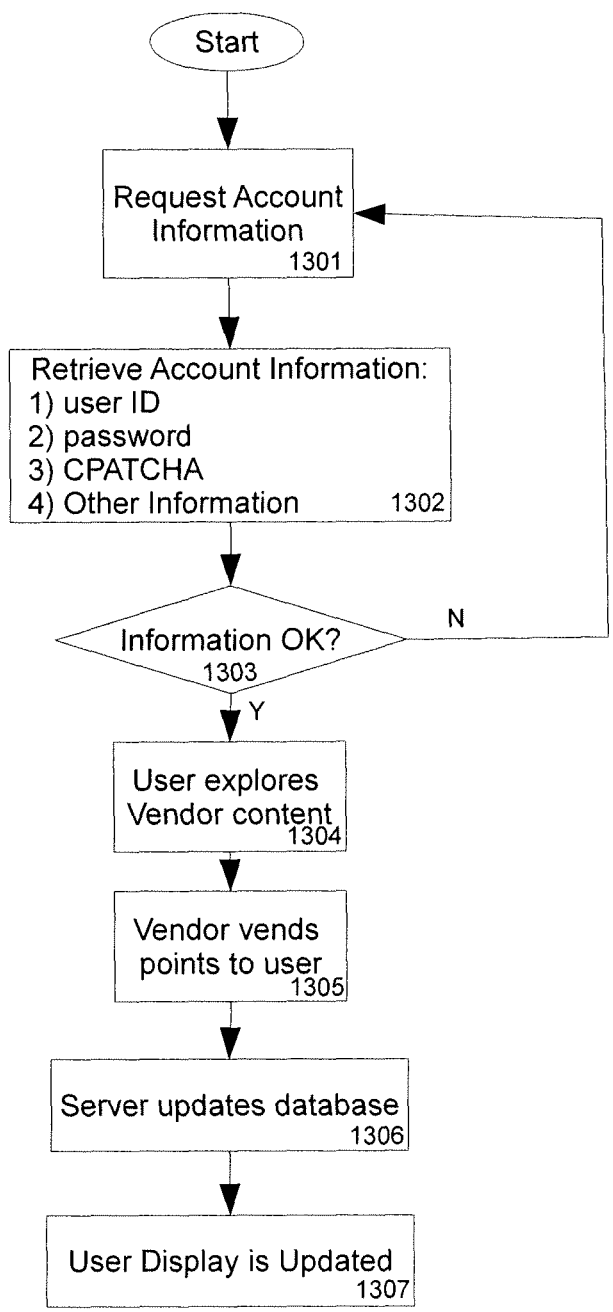
FIG. 13 is a flowchart showing the logging in and acquisition of points by a user.

Referring to FIG. 13, the required several steps that a user 801 must perform in order to receive points from a vendor, starting from a non-logged in status, is shown. When the user 801 initiates the login process, the operator server requests account information 1301 of the user 801 and the user 801 inputs it using a network enabled device. The server then analyzes this information 1302, and checks its validity 1303. If the information is correct, then the user 801 is free to explore the Internet 102 via, for example, a web browser 1502 enhanced with system components as described above. If the information is incorrect, the user 801 is not logged in and is instead redirected back to the request for account information. Once successfully logged in, the user then proceeds to browse various vendor websites and explores their content 1304. When the user 801 explores the content of a particular vendor website that has previously established a business relationship with an operator of the present invention, the associated vendor server then causes the number of points in the users account to increase by a predetermined amount 1305. This results in the operators database being updated 1306, and then the users own display being updated 1307 to reflect the change in point total. Each time the user 801 acquires points in this manner, the operator's server, the user 801, and the relevant vendor's server are all informed of the transaction.

Figure 9:
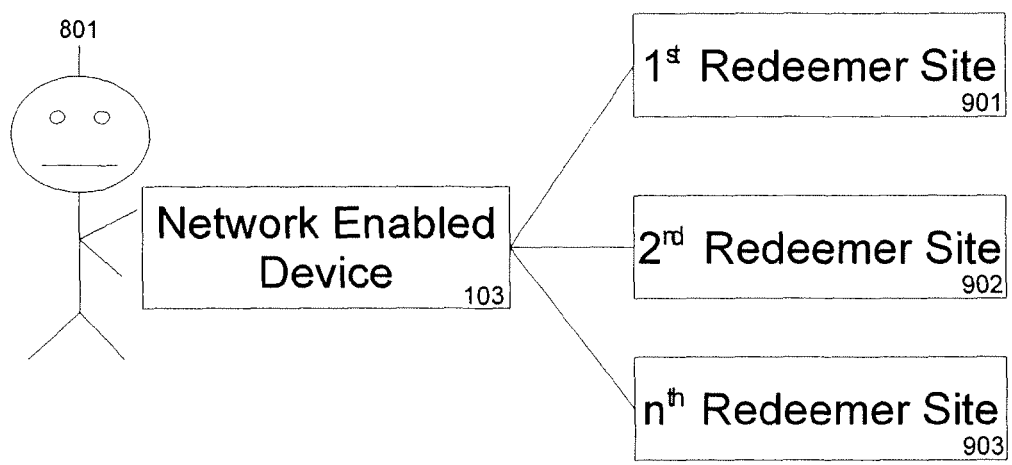
FIG. 9 is a diagram of a user accessing multiple affiliate redeemer sites.

Referring to FIG. 9, user 801 then accesses a first affiliate redeemer website 901. The third party business entity who manages this website 901 is called a "redeemer" because they accept points as a consideration which they may later redeem with the operator of the present invention for a monetary payment or other goods or services. Because user 801 accesses content provided by first redeemer website 901, first redeemer website 901 may be given points by the user 801 in exchange for providing the user with certain goods or services, As a result, the number of points in the user's account is lessened by the number of points used in the trade with the redeemer. A preferred embodiment of the present invention will commonly feature the goods and services offered by the redeemer that can be given to the user 801 via the user's network enabled device 103 using the external network 102, such as, for example, providing the user with access to certain desirable media, such as film clips, music or other audio, visual, or audiovisual materials or other content, including access provided by streaming media and/or file download methods of distribution. Although this may be a commonplace occurrence within the operation of the present invention, the redeemer may alternatively, or in addition, offer goods or services to user 801 that are not distributed or distributable over the network connection. User 801 may then navigate to a new affiliate website that may be separate second redeemer website 902, controlled by another, possibly distinct, third party business entity. Because user 801 accesses content provided by second redeemer website 902, second website 902 may likewise be given points by user 801 in exchange for certain other goods or services. User 801 may then navigate to a new website that may be separate nth redeemer website 903, controlled by yet another, possibly distinct, third party. Because user 801 accesses content provided by nth redeemer website 902, the nth website 903 may likewise be given points by user 801 in exchange for certain other goods or services. This process whereby user 801 uses a web browser or other application to navigate through numerous, possibly separate redeeming websites and trades previously received points for certain goods and services could continue for an unlimited amount of navigation and/or interactivity as well as for an unlimited number of redeemers, subject only by the amount of points the user 801 has accumulated and the redeemers affiliation with an operator of the present invention.

The points traded to redeemers from users in the manner described above are the same points the web surfers received from the vendors. As such, all of the qualities and characteristics of the points, such as their actual or perceived value, are the same. Moreover, an anonymity-related benefit of the present invention is that no redeemer is notified or otherwise made aware of any trade between a user 801 and another redeemer. More generally, no redeemer or vendor necessarily has to be notified or otherwise made aware of any point transaction between a user and any other redeemer or vendor, other than transactions involving themselves. Redeemers only need to be aware that the web surfer has accumulated points, and may be ignorant of where the points came from (i.e., which vendor affiliate was the source of such points). Though not necessarily a part of a preferred embodiment of the present invention, variable amounts of information, in both the quantitative and qualitative sense, may be transferred or permitted to be transferred between any of the parties using the present invention. Moreover, points may alternatively be made to be identifiable, and thus distinguishable, however it is not necessary for points to have these qualities.

Figure 14:
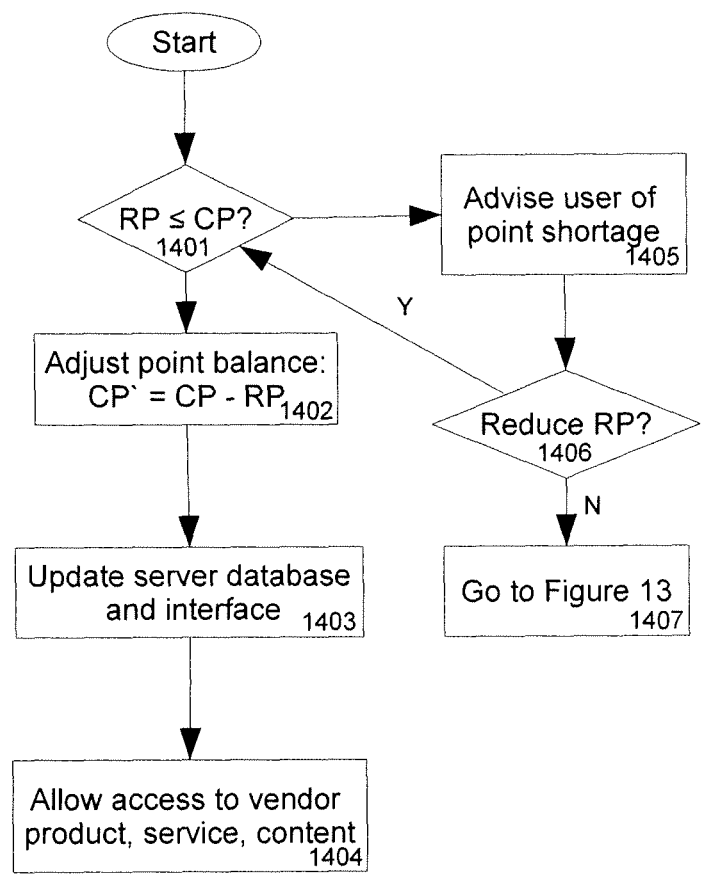
FIG. 14 is a flowchart showing a user trading previously acquired points for access to desirable content.

Referring to FIG. 14, if a user 801 has previously registered an account with an operator of the present invention, then the user can attempt to log in to the system. Assuming that the user passes all authentication checks the user will be granted access to the system. Now that the user has been logged in to the system the user can explore numerous different affiliated websites via, for example, a web browser 1502 enhanced for use in conjunction with the present system in the manner described above, in search of content or media that is desirable to the user. If a user attempts to access a redeemer's website then the system checks 1401 to see if the current user presently has acquired sufficient (i.e., and equal or greater quantity of) points, in comparison to the number of points required by the interactive or other content attempted to be accessed on the redeemer's site. If the user does have sufficient points in comparison to the number of points required by the redeemer's site, then the user's point count is adjusted 1402 by the system to reflect the deduction of points which was requested by the redeemer's server. This deduction is made in database 1403, which stores information, including aggregate point total information, pertaining to the user. Next, the redeemer server allows 1404 the user to see or otherwise access what is otherwise restricted content. If on the other hand, the user does not have sufficient points in comparison to the number of points that is required by the redeemer's site, then no modifications are made to the database and access to the restricted content remains prohibited to the user. In this case the redeemer provides an indication to the user of the shortage of points in their account 1405, and may optionally lower the number of points 1406 required by the particular user to gain access to restricted content. If the number of points is lowered by the redeemer to an amount of points less than or equal to the number of points the user has, then the user proceeds toward access of the restricted content and has their point count lowered 1401-1404. If the redeemer instead does not lower the point requirement, or does not lower it below what would allow the user to proceed in view of the user's current total of acquired points, then the user is forwarded a message urging the user to browse vendors' websites or otherwise access vendor content in order to accumulate additional points 1407.

In the present invention, neither the vendors or redeemers are operating the present invention, nor are they offering the present invention for sale. Rather, the vendors and redeemers are interacting with the present invention as "affiliates." The web surfers who are using the present invention, "users," are using the present invention as they would use many services offered to the general public through the Internet or other external networks, and thus only use and do not control the present invention. Because the affiliates and users do not control the present invention, they do not have access to the full spectrum of information used by the present invention. The only entity that has access to the full spectrum of information is the "operator" of the present invention.

Figure 10:
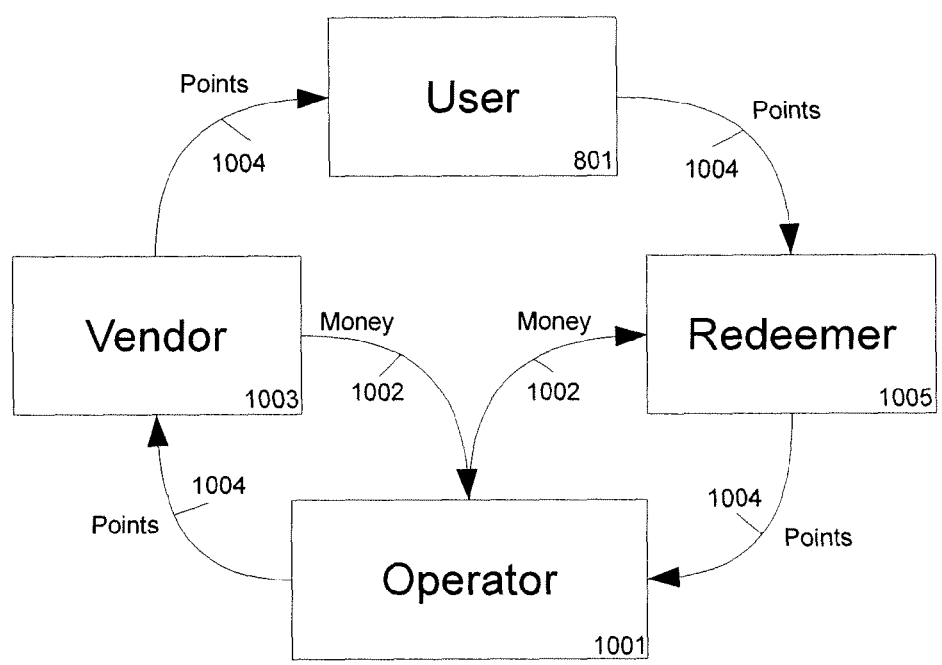
FIG. 10 is a flow diagram showing certain financial transactions and point transactions pursuant to the present invention.

Referring to FIG. 10, the operator of the present invention also sees and controls certain financial transactions. The financial transactions that allow the operator of the present invention to run a potentially profitable business may be carried out using a regionally accepted currency, commonly referred to as "money." Examples of money include but are not limited to the United States Dollars, the British Pound, the European Union Euro, gold, silver, the Chinese Yuan, and the Japanese Yen. One skilled in the art will understand that there are many forms of money not listed that could be used in the business of the operator of the present invention.

Operator 1001 of the present invention receives a payment of money 1002 through a financial transaction. This payment is made by a vendor 1003 as a form of consideration for purchasing a right to distribute a limited and predetermined number of points 1004 to users of the present invention who access their websites or other content via the present system. Once points are so purchased, vendor 1003 is then given the right to distribute its aforementioned number of points to users 801 in return for the users expending their time and effort browsing the vendor's content on their website, and thus exposing themselves to the promotion of the vendor's products or services.

Because users 801 have voluntarily explored the content of vendor 1003 they receive a certain, predetermined number of points 1004 per interaction with the vendor's website. These points are now associated with user 801 who retains ownership of such points until that same user 801 voluntarily spends, or trades them, at a redeemer's website.

A specific redeemer 1005 that receives points issues a message to operator 1001 via the system and in the manner described above, indicating how many points the system should deduct, and when and from which specific user 801 they are to be deducted. At the same time, the redeemer 1005 releases access to previously restricted content to user 801 as the other part of the aforementioned trade. Because redeemer 1005 is causing the points to be deducted from the users account by relaying an indication of the trade to operator 1001, redeemer 1005 is in effect giving the points back 1004 to operator 1001, from whom the points originated from the perspective of the redeemer.

Next, operator 1001 of the present invention engages in a financial transaction with redeemer 1005. In this financial transaction, payments of money 1002 are made from operator 1001 to redeemer 1005, in a predetermined amount that is related, at least in part, to the amount of points released by the redeemer in the aforementioned trade with the user.

In a preferred embodiment, operator 1001 will charge to vendor 1003 a certain amount of money per point for distribution rights—i.e., the right of the affiliate vendor to distribute points to authorized users via the present system. This amount of money will, in a preferred embodiment, be larger than the amount of money paid from the operator 1001 to the redeemer 1005 in exchange for the redeemer's release back to the operator of an equivalent number of points. For example, operator 1001 of the present invention may charge 0.005 US Dollars to vendor 1003 for the right to distribute 1 point. The operator 1001 may, after points have cycled through users 801 to redeemers 1005, pay to the redeemers 0.003 US Dollars per point redeemed. Continuing with this example, the operator 1001 will make 0.005−0.003=0.002 US Dollars per point cycled through the present system. This difference of 0.002 US Dollars is seen as revenue to operator 1001. Of course, the amount of money charged to affiliated vendors for the right to distribute each point, and the amount of money paid to affiliated redeemers for the right to release each point back to the system and subtract same from a user's account, are both variable. One skilled in the art will likewise understand that there are many more ways to engage in financial and point transactions in cooperation with the present invention. For example, it is contemplated by the present invention that one website can be both a redeeming website and a vending website simultaneously, so that one interaction with a user 801 gives the user points, and another interaction takes points away from the user 801. Indeed, there are a wide variety of combinations of ways users 801, vendors 1003, and redeemers 1005 may interact with each other and with an operator 1001, taking part in the transaction of money or points.

If user 801, deliberately or accidentally, accumulates a surplus of points that are not timely traded at a redeemer's website, then the amount of money the vendors 1003 paid 1002 for these points originally may be considered to be additional revenue by operator 1001, although the operator may never be fully assured that any such points will never be redeemed in the future, and thus never be fully assured that the amount vendors 1003 paid 1002 to operator 1001 is necessarily entirely revenue.

Figure 11:
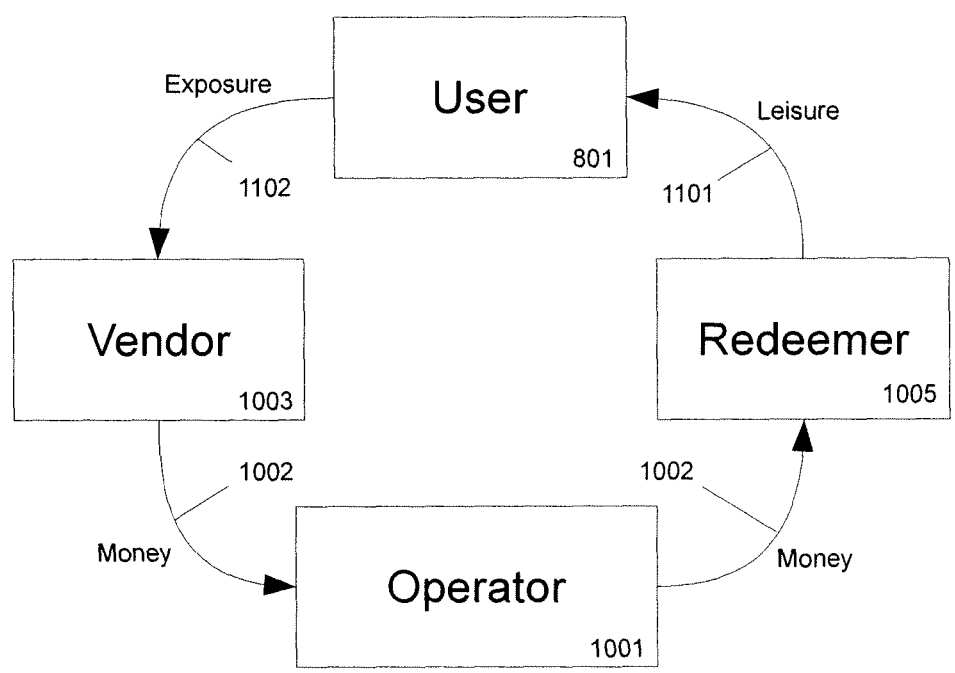
FIG. 11 is a flow diagram showing certain in-tangible consideration transactions being performed in conjunction with certain tangible consideration transactions pursuant to the present invention.

Referring to FIG. 11, additional reasons that the financial and point transactions are taking place in the present invention are shown. One reason is that redeemers 1005 have valuable and desirable content 1101 that they would like to distribute to users 801. In order for these redeemers 1005 to be able to provide this valuable content 1101 they typically must generate revenue and be profitable. Through the present invention, users 801 can view high quality, valuable content 1101 on the Internet 102 without the redeemer 1005 having to generate revenue by resorting to what are often perceived by users as annoying, distracting, time-wasting or otherwise unsolicited or undesired forms of supporting advertisement (i.e., advertising-supported content), requiring direct financial payment from the users, or other conventional ways of generating revenue.

Through such financial and point transactions provided via the present invention, vendors 1003 can reward users 801 for engaging in what some may refer to as digital window shopping at their websites. The vendors 1003 are in effect paying users 801 points 1004 in return for exposure 1102, or attention, that vendors 1003 receive from users 801. This increase in exposure 1102 may potentially correlate to, amongst other things, better brand recognition for vendor 1003, better customer retention, and/or increased sales. As users 801 explore the websites of affiliated vendors 1003 who offer points in order for such users to accumulate the aforementioned points, users 801 may be presented with promotional materials for new and exciting goods and services for sale at vendors' 1003 websites.

In general, users 801 want to spend a portion of their free or leisure time consuming electronic media being presented to them through the Internet 102. The desire of many users to consume this electronic media 1101 is sufficient to entice such users 801 to regularly accumulate points at many different vendors' 1003 websites.

Referring to FIG. 16A-16D, a preferred embodiment of the present invention utilizes a relational database, i.e., database composed of a set of interrelated tables. For example, a table of the database may be dedicated to storing information relative to users 1601, another table for vendors 1602, yet another table for redeemers 1603, and another table still for financial data 1604. Continuing with this example of database implementation, each table is composed of specific, uniquely identifiable named database table fields, or variables, of specified variable types. In more detail, there are many variables used, and each such variable is predefined and fixed to be a specific type of variable. In FIG. 16A-16D, variables of the following types are shown: 'INT,' representing is an integer; 'VARCHAR(45),' representing a character string of variable length and at most 45 characters in length; 'DATE,' representing a calendar date; 'TEXT,' representing a moderately long string of human-readable text; and 'LONG TEXT,' representing a relatively long string of human-readable text. As shown in FIGS. 16A-16D, there are also many different variables used, with the particular associated variable type being shown immediately after each variable name in tables 1601-1604.

User table 1601 includes, but is not necessarily limited to, variables such as a table identification name 1605 that increments for each new user, a system login user name 1606, the age of the user 1607 in years that could alternatively be stored as a date of birth, the current number of points in the user's account 1608, date of registration 1609, country of registration 1610, a cryptographic hash of the user's password 1611, the user's most recent IP address 1612, whether or not the user is currently logged in 1613, the number of different network enabled devices 103 the user has used to log in during the current session 1614, whether or not the user has read 1615 the End User License Agreement or other terms 1201, whether the user has agreed 1616 to those terms 1202, the email address of the user 1617, and the participating user's history of point transactions 1618, which records at every specified period of time how many points are in the user's account 1608.

Vendor table 1602 of FIG. 16B includes, but is not necessarily limited to, variables such as a table identification value 1619 that increments for each newly-added vendor, vendor name 1620, vendor's system login user name 1621, a cryptographic hash of the vendor's password 1622, a randomly assigned and unique vendor identification number 1623, vendor payment history 1624, points the vendor has given out 1625, points the vendor has redeemed 1626, the history of the points given out 1627, the history of the points that the vendor has redeemed 1628, the identification number tokenization 1629 of the vendor that permits the financial servicing of a third party in a manner that does not expose the third party's sensitive financial details to the system operator, number of administrators of the vendor 1630, the vendor administrator's user name and password hashes 1631, the number of points the vendor gives out for each user interaction 1632, the number of points the vendor redeems for each user interaction 1633, and the telephone number or other contact information of the vendor's main administrator 1634.

Redeemer table 1603 of FIG. 16C includes, but is not necessarily limited to, variables such as a table identification name 1635 that increments for each newly-added redeemer, redeemer name 1636, the redeemer's user name 1637, a cryptographic hash of the redeemer's password 1638, a randomly assigned vendor identification number 1639, redeemer payment history 1640, points the redeemer has given out 1641, points the redeemer has redeemed 1642, the history of the points given out 1643, the history of the points that the redeemer has redeemed 1644, the identification number tokenization 1645 of the redeemer that permits the financial servicing of a third party in a manner that does not expose the third party's sensitive financial details to the system operator, number of administrators of the redeemer 1646, the redeemer administrator's user name and password hashes 1647, the number of points the redeemer gives out for each user interaction 1648, the number of points the redeemer redeems for each user interaction 1649, and the telephone number or other contact information of the main administrator 1650 or alternatively any other contact information.

Figure 16A:
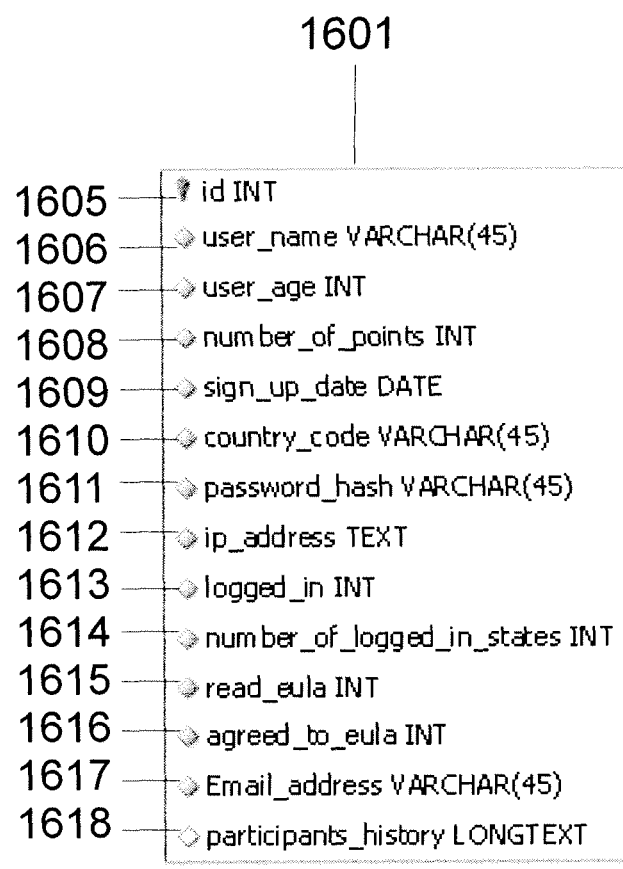
Figure 16D:
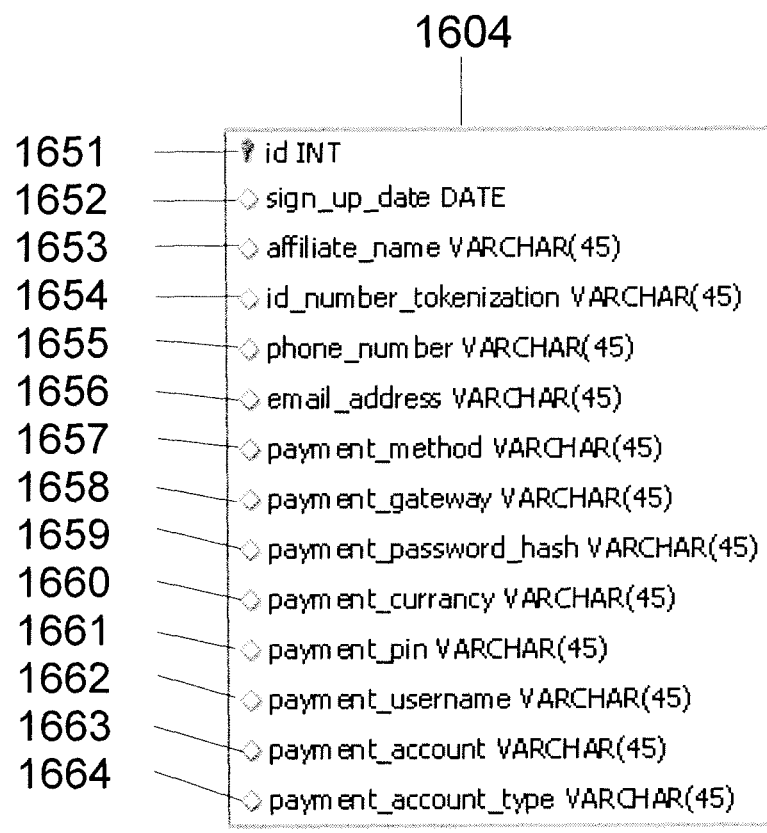

Financial table 1604 of FIG. 16D includes, but is not necessarily limited to, variables such as a table identification name 1651 that increments for each new financial record associated with a redeemer, an affiliate's sign-up date 1652, the affiliate's name 1653, the identification number tokenization 1654, the contact phone number 1655, the contact email address 1656, the payment method 1657, the payment gateway 1658, payment password hash 1659, payment currency 1660, payment personal identification number 1661, payment username 1662, payment account number 1663, and payment account type 1664.

Of course, the data described above relative to FIGS. 16A-16D is one method of many possible methods of storing, organizing, and using relevant data in a database for an application such as the present invention. Possible alternative methods of storing, organizing, and using the relevant data in conjunction with the present invention may include but is not necessarily limited to, consolidating different data elements and tables, expanding or adding different data elements and tables, changing the variable types defining how data elements are stored, changing the names of different data elements, and removing different database elements.

Figure 17:
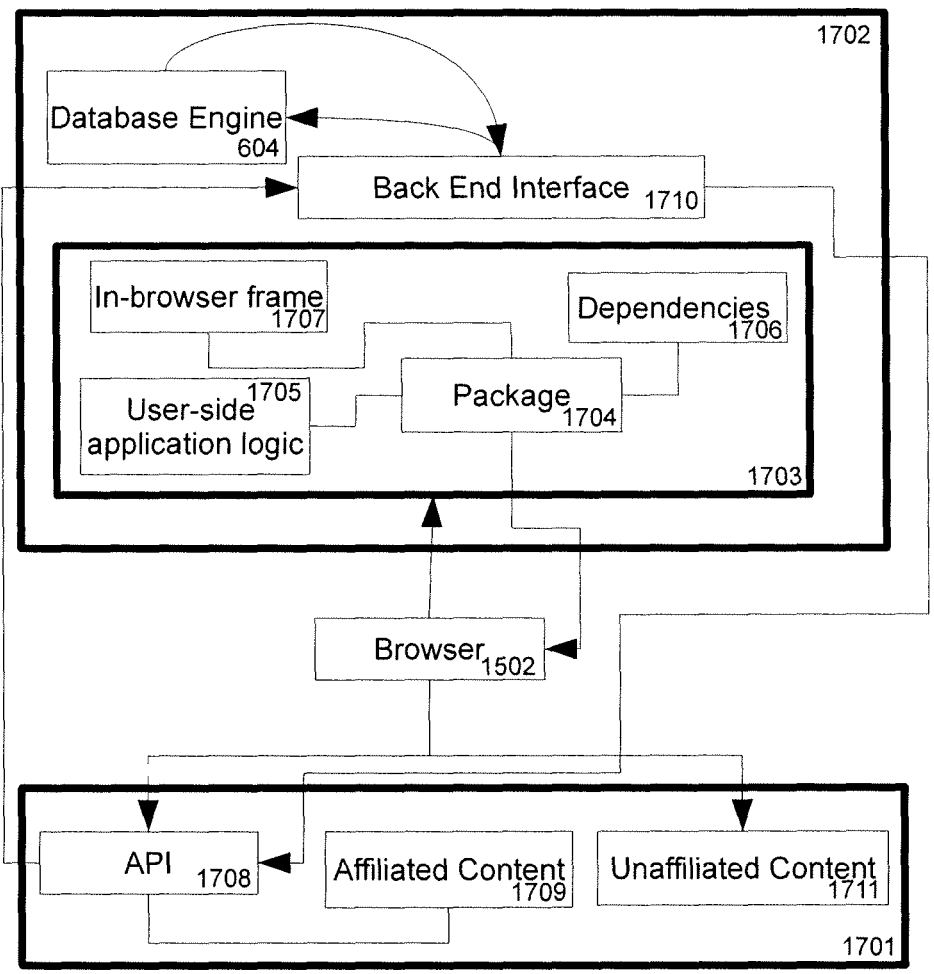
FIG. 17 is a diagram showing communication amongst certain software components the user devices, affiliate servers, and operator servers of the present invention.

Referring to FIG. 17, in a preferred embodiment, affiliate servers 1701 (including both vendor and redeemer servers), operator servers 1702, and user's device 103 all communicate electronically with each other, through the use of various software modules written in programming code. User's device 103 has a program stored on it that is capable of accessing affiliate servers 1701 and operator servers 1702 through some method; a preferred method being through the use of web browser application 1502. When user 801 logs into the system, the browser application simultaneously and transparently queries the front end servers 1703 of the system operator for a standard package of software 1704 to download, which contains a user-side in-browser logic program 1705 (which may comprise, for example, a browser plug-in, extension, or interpretable script), dependencies 1706, and in-browser frame 1707 which is primarily included in dependencies 1706. Front end servers 1703 are preferably located inside demilitarized zone 305, and in response to the aforementioned query from the user's browser application responds with standard software package 1704 to browser 1502. Software package 1704 may be downloaded transparently, and may be temporary in nature, as it may be easily deleted as a result of user actions.

After user 801 is logged in and has downloaded standardized package 1704 of FIG. 17, user 801 can navigate browser 1502 to any website on the external network 103 the user 801 wishes. If the user 801 navigates to a website containing an application programming interface ("API") 1708 managed by affiliate servers 1701, a system of electronic interactions following a predefined protocol as permitted by the API is initiated. In this method of implementing the preferred embodiment of the present invention, this API has been previously provided to the affiliate by the system operator, and implemented by the affiliate, at some earlier date.

First, to initiate this sequence of interactions, the browser 1502 sends a query to an API 1708 installed on the affiliate servers 1701 that contains the request for website content 1709, the user's 801 randomly assigned identification, and a cryptographic hash for authenticating the query. The API 1708 then sends a second query to the back end interface 1710 that contain the user's 801 randomly assigned identification, the same cryptographic hash, and other additional parameters to define the nature of the website content requested. The additional parameters in a preferred embodiment describe, but are not limited to the description of, the number of points to be vended, the number of points to be redeemed contingent upon the proper number of points in user's account, and an age requirement of the user. Upon receipt of this second query, the back end interface 1710 communicates with the database engines 604 to first authenticate the original query. If the authentication is successful, back end interface 1710 proceeds to interact with database engines 604 to decide on the result of the query that is situation dependant.

If the user is properly authenticated, several different responses to the second query are possible. If the affiliate is attempting to vend points to user 801, unless there are some age restrictions or other extenuating factors which must first be processed, back end interface 1710 instructs database engines 604 to update the number of points in the account of user 801, and retrieves the updated value. This new value and a message indicating the success of the authentication are sent in a response to API 1708 on vendor servers 1701. API 1708 then accesses content 1709 originally requested that is otherwise prohibited on vendor servers 1701 and relays such content 1709 and an updated point total to browser application 1502. The browser then displays web content 1709 originally requested in frame 1707 inside of browser 1502, and updates toolbar 1501 through the use of standard software package 1704.

If the affiliate is attempting to redeem points from user 801, unless there are some age restrictions or other extenuating factors which must first be processed, back end interface 1710 requests database engines 604 to report the current number of points in the account of user 801.

If the number of points in the user's account is less than the number of points to be redeemed, back end interface 1710 responds to the second query with a message indicating that the user has been authenticated, but does not have a sufficient number of points in the user's account to access the restricted content requested by the user. This message is sent from the back end interface 1710 to the 1708 on affiliate servers 1701. API 1708 then ascertains what content 1709 the user may be permitted to access via browser 1502 given the user's relatively limited number of aggregate points, which may be no content at all. This limited content, which does not include the restricted content that was originally requested by the user, is then sent from affiliate servers 1701 to browser 1502. Affiliate servers 1701 also send browser 1502 a message indicating that the user does not have the required number of points to view the restricted content. Browser 1502 then renders this limited content, or no content at all, and a message indicating that the content is limited or completely restricted, or that user 801 does not currently have enough points.

If the number of points in the user's account is greater than or equal to the number of points to be redeemed, back end interface 1710 instructs database engines 604 to decrement the number of points in the account of user 801 account to reflect the amount of points currently being redeemed. Back end interface 1710 then responds to the second query with a message indicating that the user has been authenticated, does have a sufficient number of points in the user's account to access the otherwise restricted content, and the updated value of the amount of points in the user's 801 account. This message is sent from back end interface 1710 to API 1708 on affiliate servers 1701. API 1708 then retrieves the specific content 1709 that browser 1502 has requested access to. Affiliate servers 1701 then send this requested content to browser 1502, along with the updated number of points in the account of user 801. Browser 1502 then renders the content, and in-browser frame 1707 updates the number of points in the account of user 801 in a manner that is visible to user 801.

If the query is sent to API 1708 installed on affiliate servers 1701 that contains the request for website content 1709, but is missing either a randomly assigned identification or a cryptographic hash, then the API will in a preferred embodiment respond with a message asking the web surfer to log in to use the present invention. If a query of standard and expected format is sent to API 1708 that does not correspond to an authenticated user 801, then back end interface 1710 will, after the authentication test fails, respond to API 1708 to indicate the failure. If the original query would have also earned the would-be user points, no points are awarded because the original query did not correspond to an authenticated user. If the original query requested access to restricted content, no access is granted. The API will respond appropriately by responding to the original query indicating no change in points in any account, and allowing access only to non-restricted content.

Affiliate servers 1701 may have content 1711 available to web surfers who are not logged in as users 801, as well as users 801 who are presently logged in. This content 1711 does not interact with API 1708, or operator servers 1702, does not differentiate logged in users 801 from other web surfers in any manner, and is generally conventional content provided by the affiliates that are not affiliated with the present invention, similar to content on any other server in the external network who is not an affiliate server and is not affiliated with the operator of the present invention in any manner.

Figure 18:
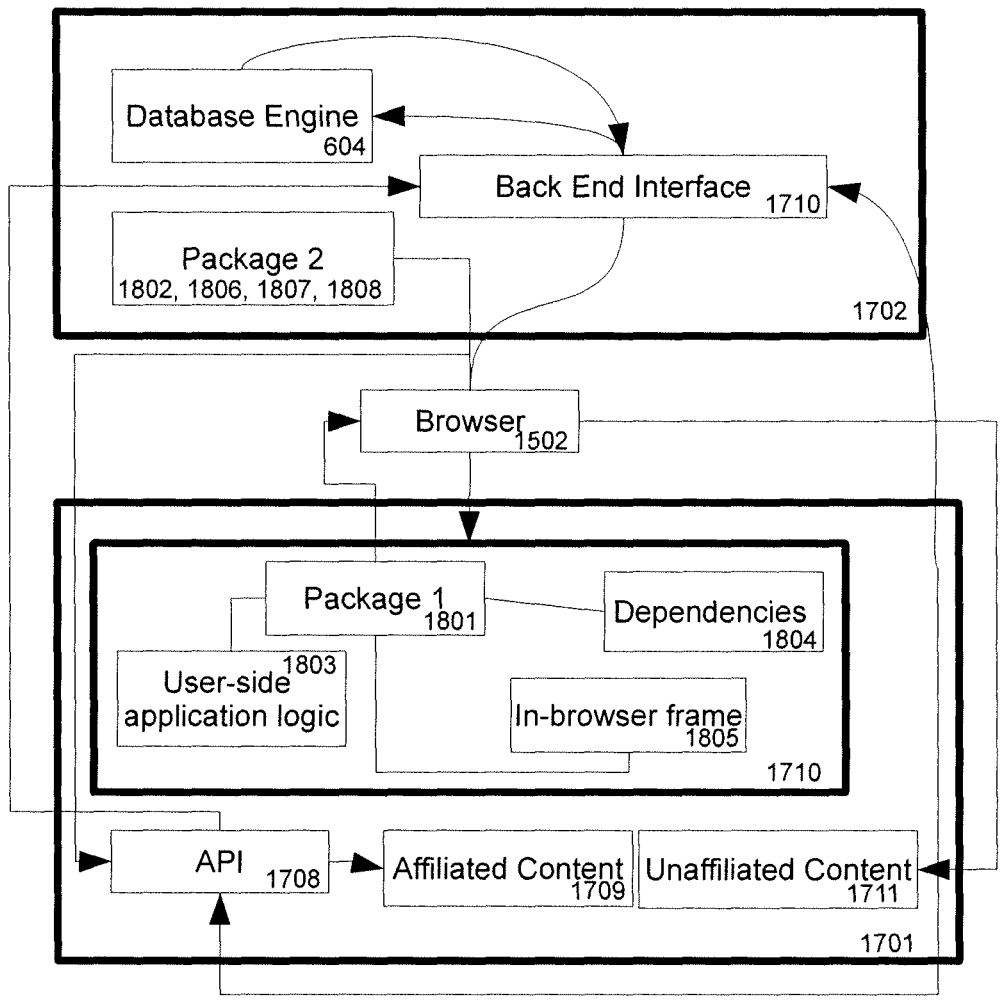
FIG. 18 is a diagram showing an alternative manner of communication amongst certain software components the user devices, affiliate servers, and operator servers of the present invention.

Referring to FIG. 18, a preferred embodiment of the present invention may allow the necessary communication between the affiliate servers 1701, operator servers 1702, and a user's device 103 through an alternative method that increases the use of affiliate servers 1701 and reduces the use of operator servers 1702. In some circumstances, this alternative method may be desirable over the method described above relative to FIG. 17.

In this method, it is much more easily allowable that user 801 will have his Uniform Resource Locator read as a web address that begins with the domain name of the affiliate's website, as opposed to the domain name of the operator's website. Another key difference in this method is that operator servers 1702 likely have less traffic to handle, which may be desirable, as well as a smaller amount of data to store in operator's servers 1702. In turn, affiliate servers 1701 must employ a larger API 1708, and will likely have more traffic to handle. This alternative method is primarily achieved by including a standard software package 1801 in the API 1708 on affiliate servers 1701, in addition to a different standard software package 1802 that is stored on operator's servers 1702, as opposed to keeping the aforementioned standard software package 1704 that is used in the method described by FIG. 17, on operator servers 1702.

In this method, a logged in user may still navigate browser 1502 to any website on the external network 103 that user 801 wishes. If user 801 navigates to a website containing an application programming interface (API) 1708 managed by affiliate servers 1701, a similar system of interactions is initiated. API 1708 must have been given to the affiliate by the operator earlier, for this method of implementing an embodiment of the present invention.

First, to initiate this system of interactions, browser 1502 sends a query to API 1708 installed on affiliate servers 1701 in order to request content. API 1708 then uploads a first standard software package 1801 to the web surfer's device, which must contain user side in-browser logic program 1803, dependencies 1804, and in-browser frame 1805. When run, software package 1801 downloads to device 103 of user 801 second standard software package 1802, which also contains user side in-browser logic program 1806, dependencies 1807, and an in-browser frame 1808. Though software packages 1801-1802 contain the same general kinds of elements, the elements themselves differ in that they support different respective tasks. Browser 1502 then uses the two software packages 1801-1802 to render two different in-browser frames 1707. First software package 1801 causes large in-browser frame 1707 to appear in the browser window, taking up all of the space in the browser window except where toolbar 1501 is located. Second software package 1802 causes a small in-browser frame 1707 to appear in the browser window that is toolbar 1501. The large in-browser frame 1707 contains the rest of the accessed content of the website targeted by the user.

The specific content that is accessed and placed in large in-browser frame 1707 is determined by the nature of the original query, the authenticity of user 801, and the number of points in the account of user 801, in the manner described above relative to FIG. 17. The relevant differences in this method are relative to what tasks each server is performing in order to produce the same ultimate results. In this method, toolbar's 1501 of in-browser frame 1707 queries back end interface 1710 directly to refresh any of the elements in toolbar 1501, such as with the textual content of messages, or an updated value of the number of points in the account of user 801.

The connection of browser's 1502 to back end interface 1710 through in-browser frame 1707 contained in second software package 1802, a downloadable first software package 1801, the functionality of software package 1704 being split between the two other software packages 1801-1802, and the storing of one of software packages 1801 in API 1708 on affiliate servers 1701, are the fundamental differences between this presently described method and the one previously described with reference to FIG. 17.

In a preferred embodiment of the present invention, activity of users 801 are tracked while users 801 are both having points vended to them by vendor affiliates and when users 801 are redeeming points with redeemer affiliates. Effectively, any action that could be taken by the interface device of user 801 could be used to trigger point transactions. In general, affiliates will be the parties that dictate what event(s) will trigger point transactions according to their own motivations and what they would like to accomplish with a user's time and attention.

Some examples of events that may trigger point transactions for vendors 1003 include: a user 801 "clicking" on internal content 1709 in a vendor website that allows vendors 1003 to vend in such a way to as to incentivize user 801 interaction with vendor content 1709; a user 801 spending a certain amount of time on a vendor website; or a user 801 navigating to a different webpage on the vendor website. Vendors 1003 could give out points for specified interaction, on a per time basis, or on a pages viewed basis. For example, relative to time spent by a user on vendor websites, vendors 1003 could give out points at a high rate for the first ten minutes and at a diminished rate after the first ten minutes have past. The vendors 1003 could give out points according to an opposite rate as well, or give out a high amount of points for a specified interaction of user 801, and less for normally viewing any additional page, or according to nearly any other methodology that vendors 1003 may desire. It will be apparent to those skilled in the art that a number of different events could be used to trigger point transactions between a user and a vendor. Events that can be used to trigger such point transactions are limited only by the ability of a vendor to interact with a user interface of a network enabled user device.

Some examples of events that could trigger point transactions for redeemers 1005 include: users "clicking" on internal content in a redeemer website, thus requiring the user to pay points to interact with a redeemer website; users spending a certain amount of time on a redeemer website, again requiring the user to pay points to view a redeemer website; redeemer 1005 could redeem points on a flat point-per-time basis; redeemer 1005 could redeem points according to how long a user has been at their website; redeemers could leverage different types of content by requiring the user payment and redeemer receipt of different amounts of points for viewing different internal content; redeemers 1005 could receive points from user 801 when the user first visits the redeemer's content; redeemer 1005 could receive points upon providing a particular service to user 801; or redeemers 1005 could receive points upon providing a product to a user 801, including files downloadable to the user's network enabled device. For example, redeemers 1005 could give out points at a high rate for the first ten minutes and at a diminished rate after the first ten minutes have past. Redeemers 1005 could give out points according to an opposite rate as well, or give out a high amount of points for a specified interaction of user 801, and less for normally viewing any additional page, or according to nearly any other methodology the redeemers 1005 may desire. It will be apparent to those skilled in the art that a number of different events could be used to trigger point transactions between a user and a redeemer. Events that can be used to trigger such point transactions are limited only by the ability of a redeemer to interact with a user interface of a network enabled user device.

Figure 19:
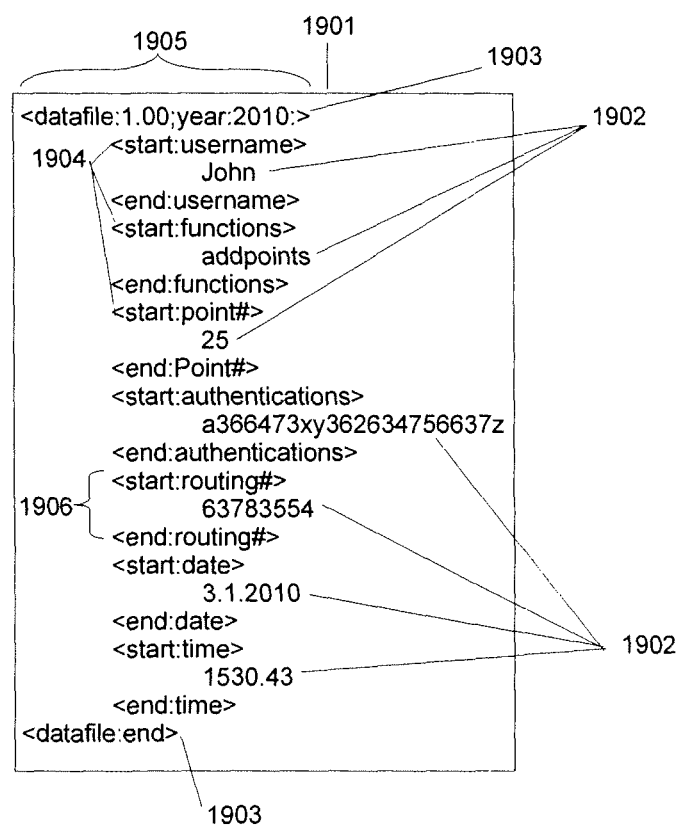
FIG. 19 is a diagram of a message format of data sent between certain servers and user devices of the present invention.

Referring to FIG. 19, message 1901 format of data 1902 sent by and between the various servers and network enabled devices 103 used in the present invention is designed, in general, for efficient generation and processing. Data 1902 is preferably transmitted in a form that may be readily processed by the various computing equipment, firmware and software implementing the present invention. Such computer equipment includes, but is not necessarily limited to; network routers, servers, network enabled devices 103, web browsers 1502, browser based logic programs, compiled code, and interpreted code. A preferred embodiment of the present invention utilizes text-based format 1903 used for messaging.

Such text-based format 1903 has within it many different subsections 1904. Each subsection 1904 is identified with a special set of alpha-numeric characters 1905. This special set of alpha-numeric characters 1905 is composed of a string of characters 1905 which would not normally appear in common text. Examples of such non-standard characters 1905 in strings include but are not necessarily limited to; "<datafile version:1.00; year:2010:>" or "(variable name=time||variable value=12:30 pm)". By using such structured sets of generally human-readable data 1902 stored in text-based format 1903, developer or operator 1001 of the present invention can readily visually inspect data 1902 being sent by and between all electronic and computer equipment responsible for running and maintaining the present invention, without the requirement for complex data analyzers. Moreover, the use of such structured sets of relatively human-readable data 1902 stored in text-based format 1903 permits all electronic and computer equipment systems involved in the present invention to relatively easily extract data 1902, as such structured data 1902 contains many regular patterns 1906. In turn, regular patterns 1906 allow electronic and computer equipment to access and manipulate any data 1902 stored in such a relatively human-readable text-based message 1901.

An example of what such text-based message 1901 may contain as data 1902 includes, but is not necessarily limited to, the following: user name, date, type of point transaction, number of points used in transaction, destination, location of sender, function call, numbers, account information, pin numbers, etc.

Of course, any number of different messaging formats may alternatively be employed in the present invention. Moreover any number of different types of data, variable names, structures, characters, character sets, fonts, font sizes, font colors, emoticons, concatenations, message lengths, file names, file extensions, encoding systems, encryption systems, programming languages, spoken languages, justifications, arrangements, arguments, markup languages, printing languages, calendars, counting systems, enumerations, categorizations, alphabetizations, could likewise be used in the present invention.

What is claimed is:

1. A method for attracting consumers to electronic-based advertising media via a communications network having endpoints comprising a plurality of vendor computer systems, each associated with at least one advertising provider, a plurality of redeemer computer systems, each associated with at least one provider of goods or services, at least one host computer system distinct from the vendor computer systems and the redeemer computer systems, and at least one user computer system, the method comprising the steps of:

identifying a consumer on the host computer as a registered user of the host computer system;

detecting that the registered user has accessed electronic-based advertising media of a first advertising provider associated with a first vendor computer system, the electronic-based advertising media being communicated from the first vendor computer system to the at least one user computer system via the communications network;

awarding the registered user a first predetermined quantity of homogeneous electronic currency in exchange for the registered user accessing the electronic-based advertising media of the first advertising provider;

storing on the at least one host computer system a stored value indicative of an aggregate amount of homogeneous electronic currency possessed by the registered user;

incrementing the stored value by a first amount indicative of the first predetermined quantity of homogeneous electronic currency;

detecting that the registered user has accessed electronic-based advertising media of a second advertising provider associated with a second vendor computer system, the electronic-based advertising media being communicated from the second vendor computer system to the at least one user computer system via the communications network;

awarding the registered user a second predetermined quantity of homogeneous electronic currency in exchange for the registered user accessing the electronic-based advertising media of the second advertising provider;

incrementing the stored value by a second amount indicative of the second predetermined quantity of homogeneous electronic currency;

detecting at the at least one host computer system that the registered user has requested particular goods or services of a first provider of goods or services via communication between the at least one user computer system and a first redeemer computer system via the communications network, the particular goods or services having an associated third predetermined quantity of homogeneous electronic currency;

determining at the at least one host computer system whether the third predetermined quantity of homogeneous electronic currency has a value equal to or less than the stored value indicative of an aggregate amount of homogeneous electronic currency possessed by the registered user and stored on the at least one host computer system;

detecting at the at least one host computer system that the registered user has requested particular goods or services of a second provider of goods or services via communication between the at least one user computer system and a second redeemer computer system via the communications network, the particular goods or services having an associated fourth predetermined quantity of homogeneous electronic currency; and determining at the at least one host computer system whether the fourth predetermined quantity of homogeneous electronic currency has a value equal to or less than the stored value indicative of an aggregate amount of homogeneous electronic currency possessed by the registered user and stored on the at least one host computer system;

wherein no personal identifying information identifying the registered user is conveyed to the first advertising provider or the second advertising provider, and no information identifying the first advertising provider or the second advertising provider is provided to the first redeemer computer system or the second redeemer computer system.

2. The method according to claim 1, further comprising the steps of:

indicating to the first redeemer computer system that the registered user has a sufficient quantity of homogeneous electronic currency to be permitted to receive or access the goods or services requested by the user from the first provider of goods or services;

decrementing on the at least one host computer the stored value by an amount indicative of the third predetermined quantity of homogeneous electronic currency;

indicating to the second redeemer computer system that the registered user has a sufficient quantity of homogeneous electronic currency to be permitted to receive or access the goods or services requested by the user from the second provider of goods or services; and decrementing on the at least one host computer the stored value by an amount indicative of the fourth predetermined quantity of homogeneous electronic currency.

3. The method according to claim 1, wherein no indication is provided to the first advertising provider or to the second advertising provider regarding how the registered user spends the first predetermined quantity or the second predetermined quantity of homogeneous electronic currency awarded in exchange for the registered user accessing the electronic-based advertising media.

4. The method according to claim 1, wherein no indication is provided to the at least one provider of goods or services regarding how the registered user acquired the second predetermined quantity of electronic information expended by the user in exchange for the goods or services of the at least one provider of goods or services.

5. The method according to claim 1, wherein no communication takes place among the first vendor computer system, the second vendor computer system, the first redeemer computer system, and the second redeemer computer system.

6. The method according to claim 1 wherein the goods or services comprises services comprising a delivery of electronic media.

7. The method according to claim 6 wherein the electronic media is sent from the first redeemer computer to the at least one user computer system via the communications network.

8. The method according to claim 1, wherein the step of detecting that the registered user has accessed electronic-based advertising media of a first advertising provider comprises detecting that the registered user has accessed particular website content associated with the first vendor computer system.

9. An apparatus for attracting consumers to electronic electronic-based advertising media, the apparatus comprising:

a communications network;

a plurality of vendor computer systems, each associated with at least one advertising provider, the plurality of vendor computer systems being operably coupled to the communications network;

a plurality of redeemer computer systems, each associated with at least one provider of goods or services, the plurality of redeemer computer systems being operably coupled to the communications network;

at least one host computer system distinct from the vendor computer systems and the redeemer computer systems and operably coupled to the communications network;

at least one user computer system associated with a consumer, the at least one user computer system being operably coupled to the communications network;

means for identifying a consumer on the host computer as a registered user of the host computer system;

means for detecting that the registered user has accessed electronic-based advertising media of a first advertising provider associated with a first vendor computer system, the electronic-based advertising media being communicated from the first vendor computer system to the at least one user computer system via the communications network;

means for awarding the registered user a first predetermined quantity of homogeneous electronic currency in exchange for the registered user accessing the electronic-based advertising media of the first advertising provider;

means for storing on the at least one host computer system a stored value indicative of an aggregate amount of homogeneous electronic currency possessed by the registered user;

means for incrementing the stored value by a first amount indicative of the first predetermined quantity of homogeneous electronic currency;

means for detecting that the registered user has accessed electronic-based advertising media of a second advertising provider associated with a second vendor computer system, the electronic-based advertising media being communicated from the second vendor computer system to the at least one user computer system via the communications network;

means for awarding the registered user a second predetermined quantity of homogeneous electronic currency in exchange for the registered user accessing the electronic-based advertising media of the second advertising provider;

means for incrementing the stored value by a second amount indicative of the second predetermined quantity of homogeneous electronic currency;

means for detecting at the at least one host computer system that the registered user has requested particular goods or services of a first provider of goods or services via communication between the at least one user computer system and a first redeemer computer system via the communications network, the particular goods or services having an associated third predetermined quantity of homogeneous electronic currency;

means for determining at the at least one host computer system whether the third predetermined quantity of homogeneous electronic currency has a value equal to or less than the stored value indicative of an aggregate amount of homogeneous electronic currency possessed by the registered user and stored on the at least one host computer system, means for detecting at the at least one host computer system that the registered user has requested particular goods or services of a second provider of goods or services via communication between the at least one user computer system and a second redeemer computer system via the communications network, the particular goods or services having an associated fourth predetermined quantity of homogeneous electronic currency; and means for determining at the at least one host computer system whether the fourth predetermined quantity of homogeneous electronic currency has a value equal to or less than the stored value indicative of an aggregate amount of homogeneous electronic currency possessed by the registered user and stored on the at least one host computer system;

wherein no personal identifying information identifying the registered user is conveyed to the at least one advertising provider, and no information identifying the advertising provider is provided to the at least one redeemer computer system.

10. The apparatus according to claim 9, further comprising:

means for indicating to the first redeemer computer system that the registered user has a sufficient quantity of homogeneous electronic currency to be permitted to receive or access the goods or services requested by the user from the first provider of goods or services;

means for decrementing on the at least one host computer the stored value by an amount indicative of the third predetermined quantity of homogeneous electronic currency;

means for indicating to the second redeemer computer system that the registered user has a sufficient quantity of homogeneous electronic currency to be permitted to receive or access the goods or services requested by the user from the second provider of goods or services; and means for decrementing on the at least one host computer the stored value by an amount indicative of the fourth predetermined quantity of homogeneous electronic currency.

11. The apparatus according to claim 9, wherein no indication is provided to the first advertising provider or to the second advertising provider regarding how the registered user spends the first predetermined quantity or the second predetermined quantity of homogeneous electronic currency awarded in exchange for the registered user accessing the electronic-based advertising media.

12. The apparatus according to claim 9, wherein no indication is provided to the at least one provider of goods or services regarding how the registered user acquired the second predetermined quantity of electronic information expended by the user in exchange for the goods or services of the at least one provider of goods or services.

13. The apparatus according to claim 9, wherein no communication takes place among the first vendor computer system, the second vendor computer system, the first redeemer computer system, and the second redeemer computer system.

14. The apparatus according to claim 9 wherein the goods or services comprises services comprising delivery of electronic media.

15. The apparatus according to claim 14 wherein the electronic media is sent from the first redeemer computer to the at least one user computer system via the communications network.

16. The apparatus according to claim 9, wherein the means for detecting that the registered user has accessed electronic-based advertising media of a first advertising provider comprises means for detecting that the registered user has accessed particular website content associated with first vendor computer system.

* * * * *